US012627501B2

(12) United States Patent (10) Patent No.: US 12,627,501 B2
Oliynyk et al. (45) Date of Patent: May 12, 2026

(54) DEVICE FOR PROTECTING CONTENT BY USING BIOMETRIC INFORMATION AND OPERATING METHOD THEREOF

(71) Applicant: Samsung Electronics Co., Ltd., Suwon-si (KR)

(72) Inventors: Andriy Oliynyk, Kyiv (UA); Dmytro Progonov, Kyiv (UA); Pavlo Kolesnichenko, Kyiv (UA); Valentyna Cherniakova, Kyiv (UA); Yevhenii Yakishyn, Kyiv (UA); Yaroslav Lavrenyuk, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 18/677,203

(22) Filed: May 29, 2024

(65) Prior Publication Data

US 2024/0313972 A1 Sep. 19, 2024

Related U.S. Application Data

(63) Continuation of application No. PCT/KR2022/021652, filed on Dec. 29, 2022.

(30) Foreign Application Priority Data

Feb. 14, 2022 (KR) ........................ 10-2022-0019140

(51) Int. Cl.
　　*H04L 9/32* (2006.01)
　　*G06V 40/16* (2022.01)
(52) U.S. Cl.
　　CPC .......... *H04L 9/3231* (2013.01); *G06V 40/166* (2022.01)

(58) Field of Classification Search
None
See application file for complete search history.

(56) References Cited

U.S. PATENT DOCUMENTS 10,268,234 B2 4/2019 Fletcher et al.
2013/0297945 A1 11/2013 Harris
(Continued)

FOREIGN PATENT DOCUMENTS

CN 205486156 U 8/2016
CN 109241757 A 1/2019
(Continued)

OTHER PUBLICATIONS

European Search Report dated Feb. 25, 2025, issued in European Application No. 22926233.2.
(Continued)

*Primary Examiner* — William J. Goodchild
(74) *Attorney, Agent, or Firm* — Jefferson IP Law, LLP

(57) ABSTRACT

A method performed by a device for protecting content by using biometric information is provided. The content protection method includes displaying, by the device, identification information of encrypted content, receiving, by the device, a user input of selecting the encrypted content, controlling, by the device, according to the reception of the user input of selecting the encrypted content, a sensor to obtain image information of a user's body part, calculating, by the device, feature information of the user's body part from the obtained image information, reproducing, by the device, a crypto key based on the calculated feature information of the user's body part and hint information stored in correspondence to the encrypted content, decrypting, by the device, the encrypted content based on the reproduced crypto key, and displaying, by the device, the encrypted content according to the decryption of the encrypted content.

19 Claims, 17 Drawing Sheets

(56) References Cited

U.S. PATENT DOCUMENTS

| | | | |
|---|---|---|---|
| 2016/0100314 A1 | 4/2016 | Chung et al. | |
| 2017/0076109 A1* | 3/2017 | Kaditz .................. | G16H 40/20 |
| 2017/0264429 A1 | 9/2017 | Ahn et al. | |
| 2018/0203990 A1 | 7/2018 | Saito et al. | |
| 2019/0020472 A1 | 1/2019 | Cho et al. | |
| 2020/0334347 A1 | 10/2020 | Hoyos et al. | |
| 2021/0157894 A1 | 5/2021 | Yamagishi et al. | |
| 2021/0344675 A1 | 11/2021 | Cui et al. | |

FOREIGN PATENT DOCUMENTS

| | | | |
|---|---|---|---|
| CN | 110892693 A | | 3/2020 |
| JP | 2004153843 A | * | 5/2004 |
| JP | 2008-269043 A | | 11/2008 |
| JP | 6707702 B | | 6/2020 |
| JP | 7142778 B2 | | 9/2022 |
| KR | 10-0876003 B1 | | 12/2008 |
| KR | 10-1052294 B1 | | 7/2011 |
| KR | 10-2018-0006250 A | | 1/2018 |
| KR | 10-1903246 B1 | | 9/2018 |
| WO | 2015/053438 A1 | | 4/2015 |

OTHER PUBLICATIONS

International Search Report dated Mar. 31, 2023, issued in International Patent Application No. PCT/KR2022/021652.

* cited by examiner

DEVICE FOR PROTECTING CONTENT BY USING BIOMETRIC INFORMATION AND OPERATING METHOD THEREOF

CROSS-REFERENCE TO RELATED APPLICATION(S)

This application is a continuation application, claiming priority under § 365(c), of an International application No. PCT/KR2022/021652, filed on Dec. 29, 2022, which is based on and claims the benefit of a Korean patent application number 10-2022-0019140, filed on Feb. 14, 2022, in the Korean Intellectual Property Office, the disclosure of which is incorporated by reference herein in its entirety.

BACKGROUND

1. Field

The disclosure relates to a device for protecting data by using biometric information and an operating method thereof.

2. Description of Related Art

In most information systems, to ensure the confidentiality and integrity of data, users need to generate their own random data, such as passwords, passcodes, or personal identification number (PIN) numbers. However, because such random data is difficult to remember, it is not easy for users to manage it.

In order to overcome this drawback of random data, there is a need for a method to extract a person's unique features from the person's biometric data, such as face, iris, fingerprint, and biometric pattern, and protect data by using the extracted features.

Also, because data to be protected can be moved to various devices, a person's biometric data or features extracted from biometric data are mainly stored on a server to encrypt or decrypt data on various devices.

However, users' biometric data should not be leaked because it is critical information related to the users' privacy, and accordingly, it is not desirable to store users' biometric data on a server.

Accordingly, a method for encrypting or decrypting data on a device without using a server is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device for protecting data by using biometric information and an operating method thereof.

Additional aspects will be set forth in part in the description which follows and, in part, will be apparent from the description, or may be learned by practice of the presented embodiments.

In accordance with an aspect of the disclosure, a method performed by a device of protecting content by using biometric information is provided. The method includes displaying, by the device, identification information of encrypted content, receiving, by the device, a user input of selecting the encrypted content, controlling, by the device, according to the reception of the user input of selecting the encrypted content, a sensor to obtain image information of a user's body part, calculating, by the device, feature information of the user's body part from the obtained image information, reproducing, by the device, a crypto key based on the calculated feature information of the user's body part and hint information stored in correspondence to the encrypted content, decrypting, by the device, the encrypted content based on the reproduced crypto key, and displaying, by the device, the encrypted content according to the decryption of the encrypted content.

In accordance with another aspect of the disclosure, a device for protecting content by using biometric information is provided. The device includes a sensor, memory storing one or more computer programs, and one or more processors communicatively coupled to the sensor and the memory, wherein the one or more computer programs include computer-executable instructions that, when executed by the one or more processors, cause the device to display identification information of encrypted content, receive a user input of selecting the encrypted content, control the sensor to obtain image information of a user's body part according to the reception of the user input of selecting the encrypted content, calculate feature information of the user's body part from the obtained image information, reproduce a crypto key based on the calculated feature information of the user's body part and hint information stored in correspondence to the encrypted content, decrypt the encrypted content based on the reproduced crypto key, and display the encrypted content according to the decryption of the encrypted content.

In accordance with another aspect of the disclosure, one or more non-transitory computer-readable storage media storing one or more computer programs including computer-executable instructions that, when executed by one or more processors of an device, cause the device to perform operations are provided. The operations include displaying, by the device, identification information of encrypted content, receiving, by the device, a user input of selecting the encrypted content, controlling, by the device, according to the reception of the user input of selecting the encrypted content, a sensor to obtain image information of a user's body part, calculating, by the device, feature information of the user's body part from the obtained image information, reproducing, by the device, a crypto key based on the calculated feature information of the user's body part and hint information stored in correspondence to the encrypted content, decrypting, by the device, the encrypted content based on the reproduced crypto key, and displaying, by the device, the encrypted content according to the decryption of the encrypted content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 shows a method of providing encrypted content in a device, according to an embodiment of the disclosure;

FIG. 6 shows a method of providing a list of encrypted content in a device, according to an embodiment of the disclosure;

Throughout the drawings, it should be noted that like reference numbers are used to depict the same or similar elements, features, and structures.

DETAILED DESCRIPTION

Figure 1:
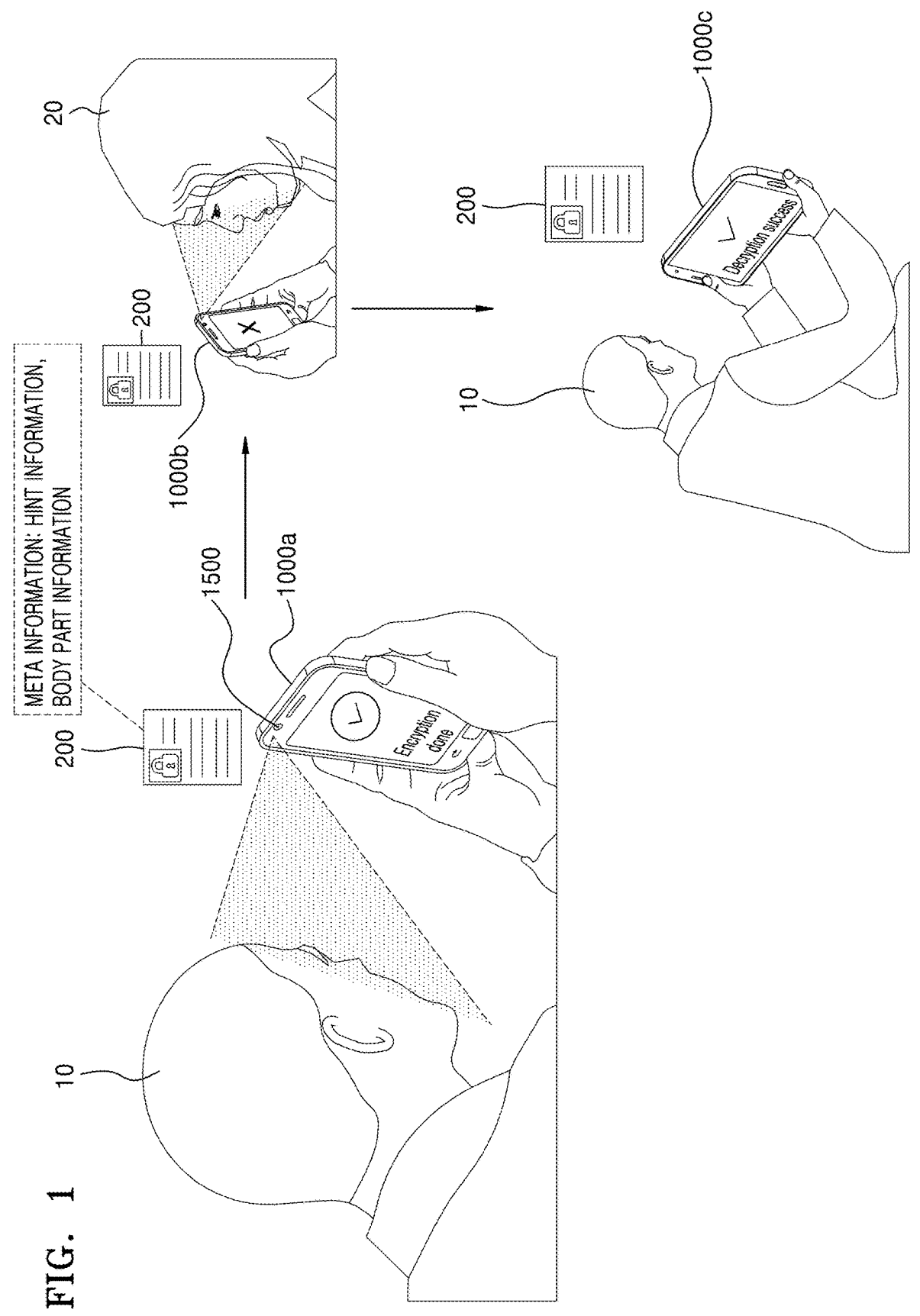
FIG. 1 shows a method of protecting content in a device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates "a", "b", "c", "a and b", "a and c", "b and c", "all of a, b, and c", or variations thereof.

Although general terms being currently used were selected as terminology used in the disclosure while considering the functions of the disclosure, they may mean various different terms according to intentions of one of ordinary skill in the art, judicial precedents, the advent of new technologies, and the like. Hence, the terms used in the disclosure must be interpreted based on the meanings of the terms and the entire contents of the disclosure, not by simply stating the terms themselves.

Also, although the terms first, second, etc. are used to describe various components, the components should not be limited by the terms. These terms are only used to distinguish one component from another.

Also, the terms used in the disclosure are used for describing the specific embodiments, not for the purpose of limiting the disclosure. In this specification, it will be understood that the case in which a certain portion is "connected" to another portion includes the case in which the portion is "electrically connected" to the other portion with another device in between, as well as the case in which the portion is "directly connected" to the other portion. Also, it will be understood that when a certain portion "includes" a certain component, the portion does not exclude another component but can further include another component, unless the context clearly dictates otherwise.

The phrases "in some embodiments" or "according to an embodiment" appearing in various parts of the specification do not necessarily indicate the same embodiment.

The embodiments of the disclosure may provide a device for encrypting or decrypting content that may move between users by using biometric information, and an operating method thereof.

Also, the embodiments of the disclosure may provide a device for encrypting and decrypting content conveniently by using biometric information, and an operating method thereof.

Technical objects to be achieved are not limited to the above-described technical objects, and other technical objects may exist.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

FIG. 1 shows a method of protecting content in a device, according to an embodiment of the disclosure.

Referring to FIG. 1, a device 1000 may encrypt and decrypt content by using a user's biometric information.

Encrypting content may mean changing a file of the content to allow only an authorized user to access data of the content.

Also, encrypted content may be content that allows an access only by an authorized user.

Also, decrypting encrypted content may mean obtaining data of the encrypted content from a file of the encrypted content based on authentication.

Also, upon encryption of entire content included in a file, encrypting the content may be referred to as encrypting the file.

A first device 1000a of a first user 10 may obtain feature information of a face of a first user 10 by using a sensor 1500, calculate hint information and a crypto key based on the obtained feature information, and encrypt content based on the calculated crypto key.

Also, the first device 1000a of the first user 10 may store the hint information in correspondence to the encrypted content. For example, the first device 1000a of the first user 10 stores encryption information as meta information of a file 200 including the encrypted content, and the encryption information may include information indicating that the file includes encrypted content, position information of data corresponding to the encrypted content in the file, the hint information, information about a body part used for encryp-tion, information about a sensor used in encryption, and information about a decryption method, although not limited thereto. Also, the information about the decryption method may include information about a preprocessing method, a feature extraction method, a crypto key generation method, and a method of decrypting content based on a crypto key.

After the file 200 including the encrypted content is transmitted to a device 1000b of a second user 20, the device 1000b of the second user 20 may control, in response to reception of a user input of selecting the encrypted content, a sensor based on the information about the sensor and the information about the body part, included in the file 200, to obtain feature information of a face of the second user 20. Also, the device 1000b of the second user 20 may obtain the hint information included in the file 200. The device 1000b of the second user 20 may generate a crypto key based on the obtained hint information and the feature information of the face of the second user 20.

The hint information obtained from the file 200 may be identical to the hint information calculated upon encryption of the content by the first device 1000a of the first user 10, and the feature information of the face of the second user 20 may be different from the feature information of the face of the first user 10. Therefore, the crypto key generated by the device 1000b of the second user 20 may be different from the crypto key used upon encryption of the content. Accord-ingly, the device 1000b of the second user 20 may fail to decrypt the encrypted content. Also, the device 1000b of the second user 20 may display a message indicating that the encrypted content cannot be decrypted.

After the file 200 including the encrypted content is transmitted from the device 1000b of the second user 20 to a second device 1000c of the first user 10, the second device 1000c of the first user 10 may control, in response to reception of a user input of selecting the encrypted content, a sensor based on the information about the sensor and the information about the body part, included in the file 200, to obtain the feature information of the face of the first user 10. Also, the second device 1000c of the first user 10 may obtain the hint information included in the file 200. The second device 1000c of the first user 10 may generate a crypto key based on the obtained hint information and feature informa-tion.

Because the obtained feature information of the face of the first user 10 is identical to the feature information of the face of the first user 10 used upon encryption of the content, the crypto key generated by the second device 1000c of the first user 10 may be identical to the crypto key used upon encryption of the content. Accordingly, the second device 1000c of the first user 10 may decrypt the encrypted content. Also, according to the decryption of the encrypted content, the second device 1000c of the first user 10 may display the encrypted content based on data obtained from the file 200.

Accordingly, because content is encrypted or decrypted only based on biometric information obtained from a user without storing a crypto key or feature information in a device or server, there may be no risk that the crypto key or feature information will leak out.

Figure 2:
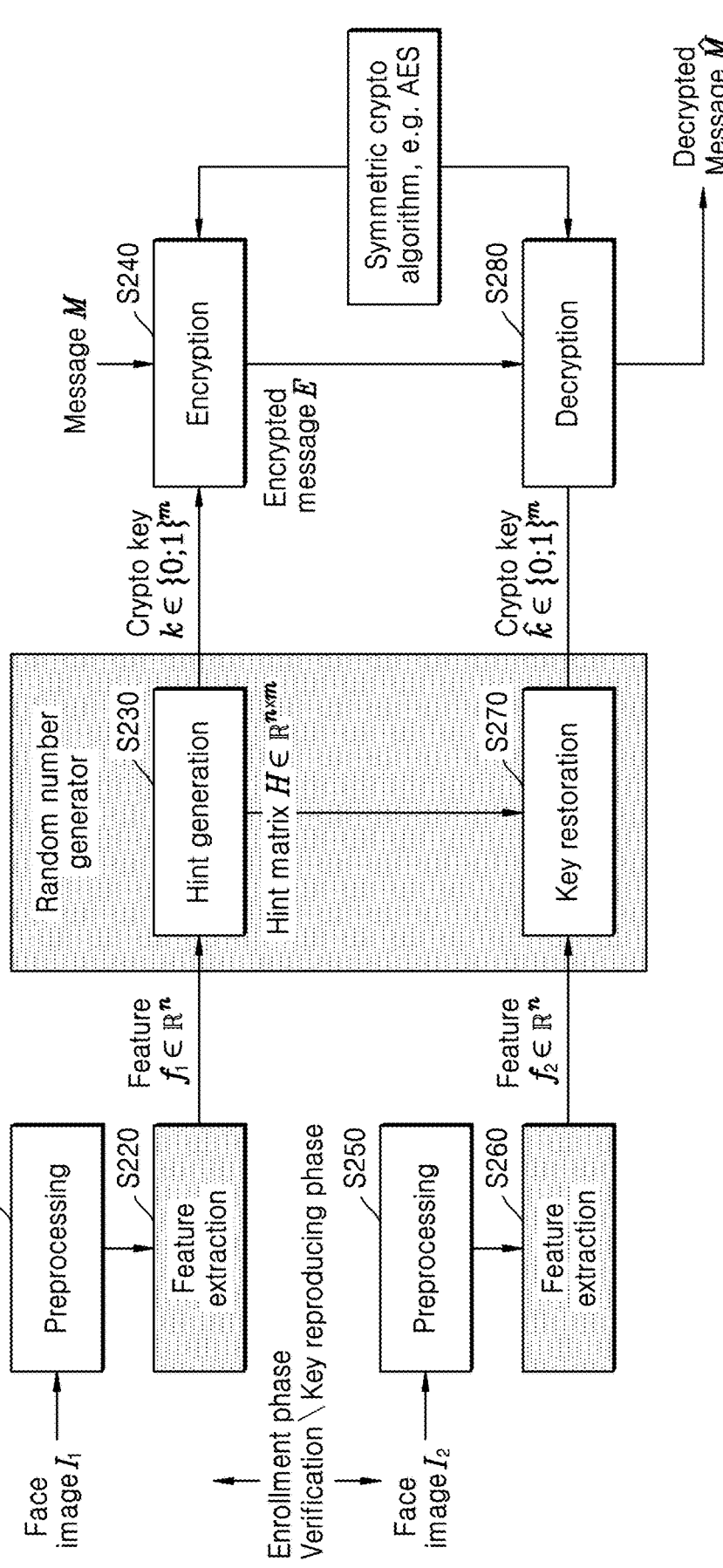
FIG. 2 shows a method of encrypting and decrypting content by using a user's biometric information in a device, according to an embodiment of the disclosure.

FIG. 2 shows a method of encrypting and decrypting content by using a user's biometric information in a device, according to an embodiment of the disclosure.

Referring to FIG. 2, in operation S210, the device 1000 may perform preprocessing on a face image $I_1$ to generate a preprocessed face image.

The device 1000 may obtain the face image $I_1$. The face image $I_1$ may be a face image of a user who attempts to encrypt content.

According to an embodiment, the device 1000 may obtain the face image through a 3-Dimensional (3D) sensor. For example, the device 1000 controls an infrared laser projector to radiate a plurality of laser beams onto a face of a user who has selected encrypted content, control a Time-of-Flight (ToF) camera to detect a time taken for the plurality of laser beams to hit the user's face and return, obtain depth infor-mation of the face based on the detected time, and set the obtained depth information of the face to a face image.

Also, according to another example, the device 1000 may control the infrared laser projector to radiate infrared dots with a specific pattern onto the user's face, control, in response to deformation of the radiated infrared dots accord-ing to the user's face shape, an infrared camera to capture shapes of the deformed infrared dots, and set information about the captured shapes of the infrared dots to a face image.

Also, according to an embodiment, the device 1000 may obtain a face image through a 2-Dimensional (2D) sensor. For example, the device 1000 obtains a user's face image by controlling a red, green, and blue (RGB) camera.

As an example of preprocessing, the device 1000 may filter noise in the face image. Also, according to another example, the device 1000 may identify a face area in the face image, or identify positions of reference parts of the face, such as eyes or nose, in the face image. Also, the device 1000 may normalize a size of the face area.

In operation S220, the device 1000 may calculate feature information $f_1$ from the preprocessed face image.

For example, the device 1000 obtains 3D positions of reference parts of the face, such as eyelids, nose, cheekbones, and chin, as feature information. Also, the device 1000 may obtain 3D distances of the reference parts of the face as feature information. Also, according to another example, the device 1000 may obtain 2D positions, sizes, and shapes of the reference parts of the face, as feature information.

The device 1000 may calculate the feature information $f_1$ in a form of an n-dimensional vector.

In operation S230, the device 1000 may calculate a crypto key and hint information based on the feature information $f_1$.

For example, the device 1000 generates m random vectors through a random number generator, and generate hint information H and a crypto key k having m elements based on the m random vectors and the feature information $f_1$. The hint information H may be a n×m-dimensional matrix. In this case, the device 1000 may calculate the crypto key k and the hint matrix H such that an i-th element of the crypto key k is related to an i-th column of the hint information H. An embodiment related to operation S230 will be described with reference to FIG. 15, below.

In operation S240, the device 1000 may encrypt content based on the crypto key.

For example, the device 1000 encrypts the content by using a module that implements a Symmetric crypto algorithm. The Symmetric crypto algorithm includes, for example, an Advanced Encryption Standard (AES) algorithm, although not limited thereto.

The content may be image content or text content, although not limited thereto. Also, the content may be content in a form of a file or content in a form of a data list.

According to an embodiment, the device 1000 may encrypt the content by obtaining data representing the content from a file of the content, calculating a hash value M of the obtained data, encrypting the calculated hash value M based on the crypto key k to generate an encrypted hash value E, and storing the encrypted hash value E and the hint information H as meta information of the file.

Operations S210 to S240 are described as operations of encrypting content M in the device 1000. Operations S250 to S280 are described as operations of decrypting the encrypted content M in the device 1000.

In operation S250, the device 1000 may perform preprocessing on a face image $I_2$ to generate a preprocessed face image.

The device 1000 may obtain the face image $I_2$ through a sensor. The face image $I_2$ may be a face image of a user who attempts to decrypt encrypted content. Obtaining a face image and preprocessing are described with reference to operation S210.

In operation S260, the device 1000 may calculate feature information $f_2$ from the preprocessed face image.

The feature information $f_2$ may also be a n-dimensional vector. Operation S260 is described with reference to operation 220.

In operation S270, the device 1000 may generate a crypto key $\hat{k}$ based on the hint information H and feature information $f_2$.

The device 1000 may obtain the hint information H from the file of the encrypted content.

Also, the device 1000 may calculate an i-th element of a crypto key based on the i-th column of the hint information H and the feature information $f_2$. Because the hint information H is a n×m matrix, the device 1000 may generate a crypto key $\hat{k}$ having m elements. An embodiment related to operation S270 will be described with reference to FIG. 16, below.

In the case in which $f_1$ is identical to $f_2$, the crypto key k used in encryption of operation S240 may be identical to the crypto key $\hat{k}$ generated in operation S270. In the case in which $f_1$ is different from $f_2$, the crypto key k used in encryption of operation S240 may be different from the crypto key $\hat{k}$ generated in operation S270.

In operation S280, the device 1000 may decrypt the encrypted content based on the generated crypto key.

The device 1000 may obtain an encrypted hash value E from the file of the content, and decrypt the encrypted hash value E based on the generated crypto key $\hat{k}$ to generate a hash value $\hat{M}$. Also, the device 1000 may obtain data of the content from the file of the content, calculate a hash value of the obtained data, and identify whether a user of the feature information $f_2$ is a true user who has encrypted the content, based on whether the hash value $\hat{M}$ generated by being decrypted is identical to the calculated hash value.

According to the crypto key $\hat{k}$ being identical to the crypto key k, the hash value $\hat{M}$ generated by being decrypted may be identical to the calculated hash value. However, according to the crypto key $\hat{k}$ being different from the crypto key k, the hash value $\hat{M}$ generated by being decrypted may be different from the calculated hash value.

Therefore, according to the hash value $\hat{M}$ being different from the calculated hash value, the device 1000 may display a message indicating that the content cannot be decrypted, for a user.

Also, according to the hash value $\hat{M}$ being identical to the calculated hash value, the device 1000 may identify the user of the feature information $f_2$ as a true user who has encrypted the content, obtain data of the content from the file of the encrypted content, and display the encrypted content based on the obtained data.

Figure 3:
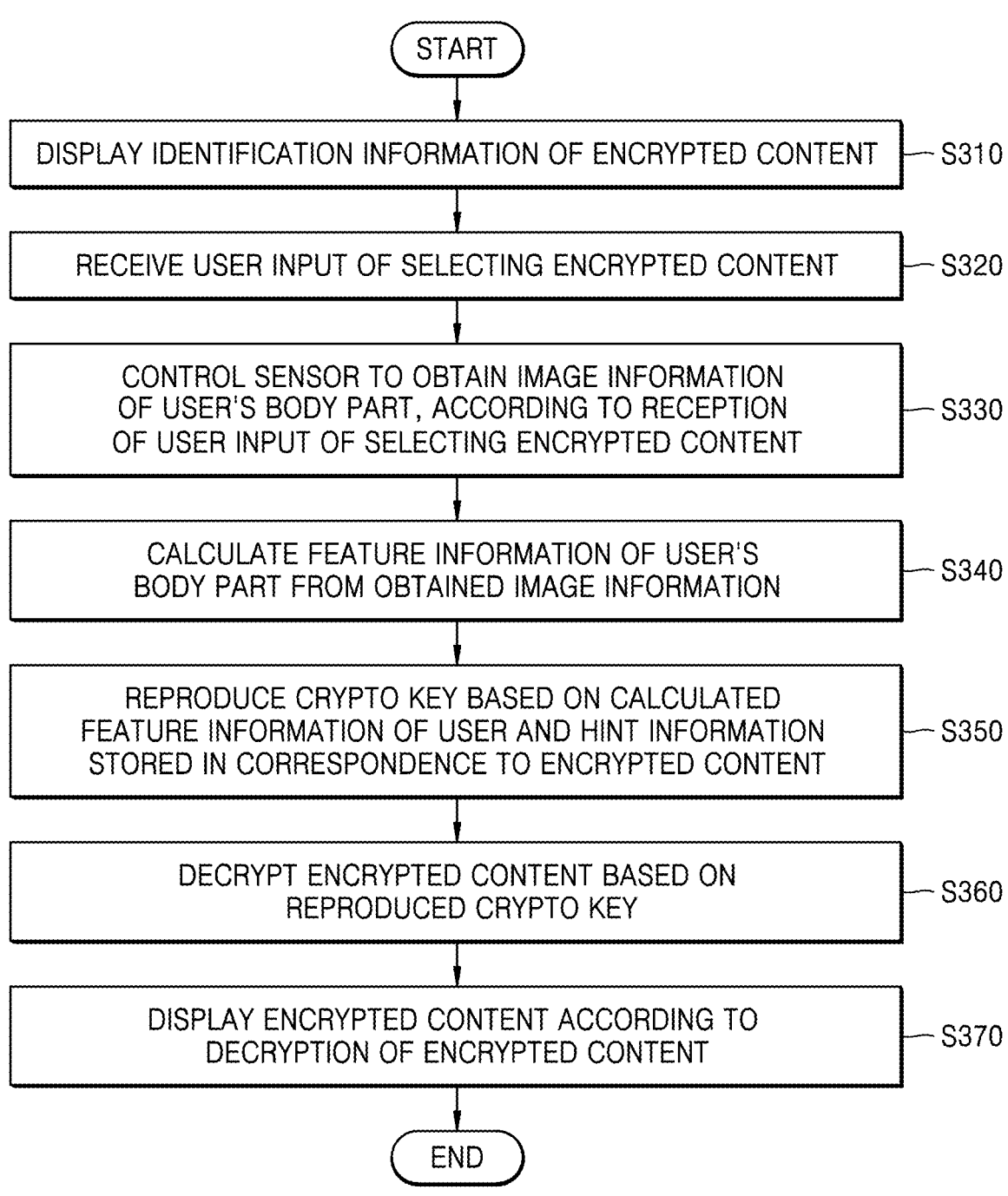
FIG. 3 is a flowchart illustrating a method of protecting content in a device, according to an embodiment of the disclosure.

FIG. 3 is a flowchart illustrating a method of protecting content in a device, according to an embodiment of the disclosure.

Referring to FIG. 3, in operation S310, the device 1000 may display identification information of encrypted content.

The device 1000 may display an icon indicating encrypted content as the identification information of the encrypted content. Also, the device 1000 may display identification information of a body part used for encryption of the encrypted content, as the identification information of the encrypted content.

In operation S320, the device 1000 may receive a user input of selecting the encrypted content.

In operation S330, according to the reception of the user input of selecting the encrypted content, the device 1000 may control a sensor to obtain image information of a user's body part.

For example, according to the reception of the user input of selecting the encrypted content, the device 1000 obtains sensor information from a file of the encrypted content. Also, the device 1000 may control a sensor to obtain an image of the user's body part.

In operation S340, the device 1000 may calculate feature information of the user's body part from the obtained image information.

In operation S350, the device 1000 may reproduce a crypto key based on the calculated feature information of the user and hint information stored in correspondence to the encrypted content.

The hint information may be included, as meta information of the file including the encrypted content, in the file. Operation S350 is described with reference to FIG. 2 or 16.

In operation S360, the device 1000 may decrypt the encrypted content based on the reproduced crypto key.

For example, the device 1000 identifies whether the user who has selected the encrypted content is a true user who has encrypted the content, based on the crypto key. According to identification that the user who has selected the encrypted content is the true user who has encrypted the content, the device 1000 may obtain data of the encrypted content from the file of the encrypted content.

In operation S370, according to the decryption of the encrypted content, the device 1000 may display the encrypted content.

The device 1000 may display the encrypted content based on the obtained data.

According to an embodiment, the device 1000 may receive a user input of selecting a folder including at least one piece of encrypted content. According to the reception of the user input of selecting the folder, the device 1000 may control a preset sensor to obtain image information of a user's body part. Also, the device 1000 may decrypt the at least one piece of encrypted content based on the obtained image information.

Also, according to an embodiment, the encrypted content may be content encrypted based on image information of a plurality of users' body parts. In this case, the device 1000 may obtain the image information of the plurality of users' body parts, and decrypt the content based on the obtained image information.

Figure 4:
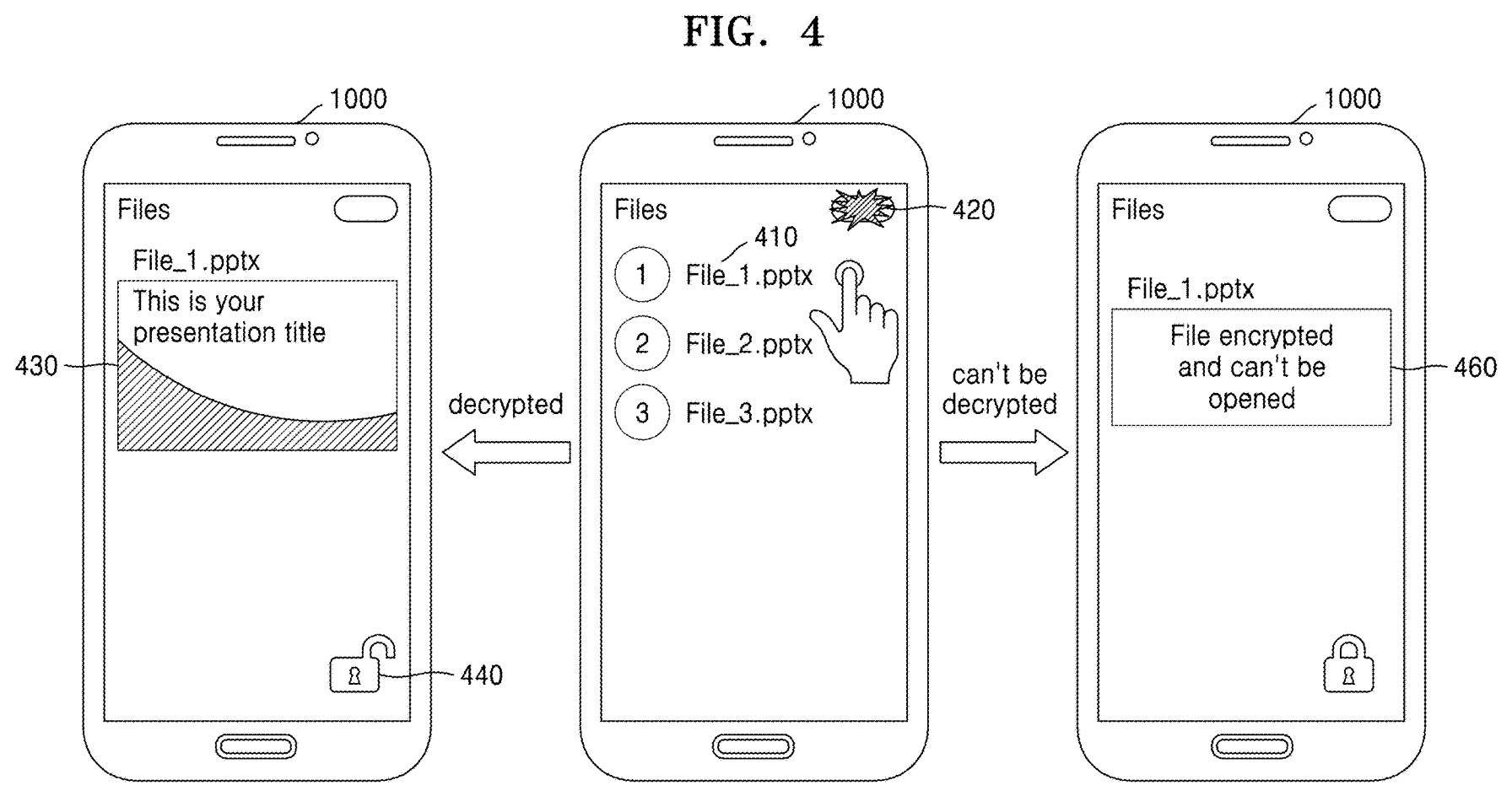

FIG. 4 shows a method of providing encrypted content in a device, according to an embodiment of the disclosure.

Referring to FIG. 4, the device 1000 may display a list of content.

According to reception of a user input of selecting identification information 410 of an encrypted file "File_1.pptx" in the list of content, the device 1000 may identify whether the file "File_1.pptx" is an encrypted file and obtain encryption information, from meta information of the file "File_1.pptx".

According to the encryption information including "face" as body part information and "RGB camera" as sensor information, the device 1000 may drive a RGB camera 420 to obtain a user's face image.

The device 1000 may generate a crypto key based on hint information included in the meta information of the file "File_1.pptx" and feature information calculated from the obtained face image, and attempt to decrypt the file "File_1.pptx" based on the generated crypto key.

According to identification that the user who has selected the file "File_1.pptx" is a true user who has encrypted the file "File_1.pptx", the device 1000 may display, content 430 of the file "File_1.pptx". In this case, the device 1000 may display an image 440 representing that the content 430 has been decrypted, together with the content 430.

According to identification that the user who has selected the file "File_1.pptx" is not the true user who has encrypted the file "File_1.pptx", the device 1000 may display a message 460 indicating that the file "File_1.pptx" cannot be opened.

Figure 5:
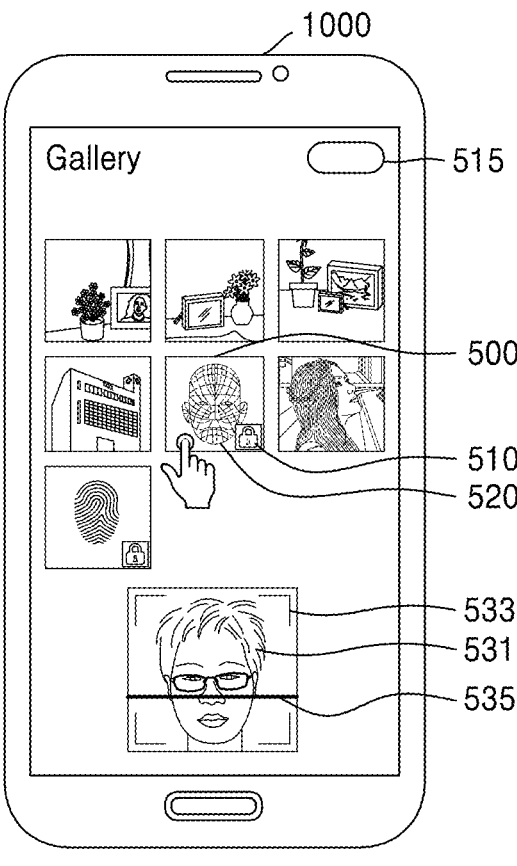
FIG. 5 shows a method of displaying encrypted content in a device, according to an embodiment of the disclosure.

FIG. 5 shows a method of displaying encrypted content in a device, according to an embodiment of the disclosure.

Referring to FIG. 5, the device 1000 may display identification information (i.e., an image 520) of a body part used for encryption of encrypted content, together with an icon 510 representing encrypted content.

For example, according to reception of a user input for displaying a list of content, the device 1000 obtains encryption information included in meta information of the content. The encryption information may include body part information. The body part information may be face, iris, or fingerprint, although not limited thereto.

Referring to FIG. 5, the device 1000 may display, as identification information of encrypted content 500, the image 520 representing a face that is a body part used for encryption, together with the icon 510 representing encrypted content.

According to reception of a user input of selecting the encrypted content 500, the device 1000 may obtain sensor information from a file of the encrypted content 500 and control a sensor based on the obtained sensor information.

Also, as another example, according to reception of a user input of displaying content one by one in order by swiping the content, the encrypted content 500 may be displayed, and according to the encrypted content 500 being displayed on a screen, the device 1000 may obtain sensor information from the file of the encrypted content 500 and control a sensor based on the obtained sensor information.

The file of the encrypted content 500 may include encryption information, and the encryption information may include the sensor information. The sensor information may include a kind of a sensor. For example, according to the body part used for encryption being a fingerprint, the kind of the sensor is a fingerprint sensor.

Also, according to the body part used for encryption being a face, the sensor information may include a kind of light irradiated onto the body part and a kind of a sensor. For example, the kind of light and the kind of the sensor is a laser and a laser receiver, an infrared light and an infrared camera, or natural light and a RGB camera.

Referring to FIG. 5, in the case in which the body part used for encryption of the encrypted content 500 is a face and the kind of light and the kind of the sensor are laser and a laser receiver, the device 1000 may drive laser and a laser receiver 515 according to reception of a user input of selecting the encrypted content 500.

Also, the device 1000 may display guide information for guiding photographing of a body part. The guide information may include information for guiding a position of a photographing area of the body part and information for notifying start and end times of photographing, although not limited thereto.

For example, referring to FIG. 5, the device 1000 displays a reference line 533 for guiding a position of a photographing area of a face part. Also, the device 1000 may display an image 531 of a user's face based on data received through the laser receiver 515. Also, the device 1000 may display a scan bar 535 for notifying start and end times of photographing.

Figure 6:
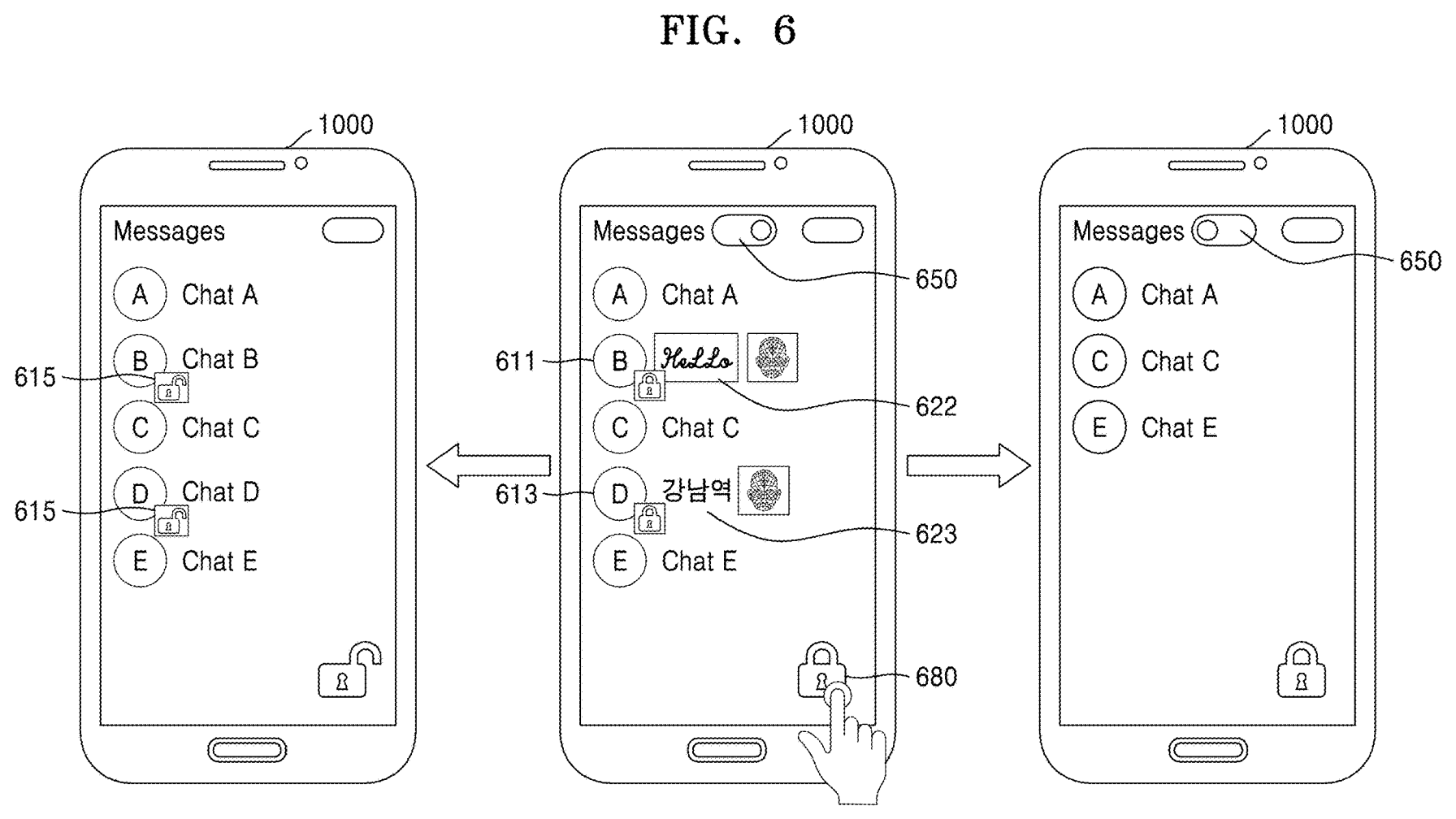

FIG. 6 shows a method of providing a list of encrypted content in a device, according to an embodiment of the disclosure.

Referring to FIG. 6, the device 1000 may display a list of content including encrypted content 611 and 613. The content may be a voice message or text message.

Also, the device 1000 may display user information (i.e., a signature 622) and (i.e., text 623) as identification information of the encrypted content 611 and 613. A file of the encrypted content 611 and 613 may include encryption information as meta information, and the encryption information may include user information as the identification information of the encrypted content 611 and 613. The user information may be selected by a user upon encryption of the content, and may include at least one of an image, an icon, a signature 622, or text 623, although not limited thereto.

Also, the device 1000 may provide a menu capable of simultaneously decrypting all encrypted content in the list of content. For example, according to reception of a user input of selecting a lock icon 680, the device 1000 controls a sensor to obtain an image of the user's body part and decrypt the encrypted content 611 and 613 based on the obtained image. According to the decryption of the encrypted content 611 and 613, the device 1000 may display an icon 615 indicating that the encrypted content 611 and 613 has been decrypted, and display original identification information (e.g., Chat B and Chat D) of the encrypted content 611 and 613.

Also, the device 1000 may provide a menu for hiding the encrypted content 611 and 613. For example, according to reception of a user input of selecting a hide button 650 displayed together with the list of content, the device 1000 does not display a list of the encrypted content 611 and 613 in the list of content, while displaying only a list of unencrypted content.

Figure 7:
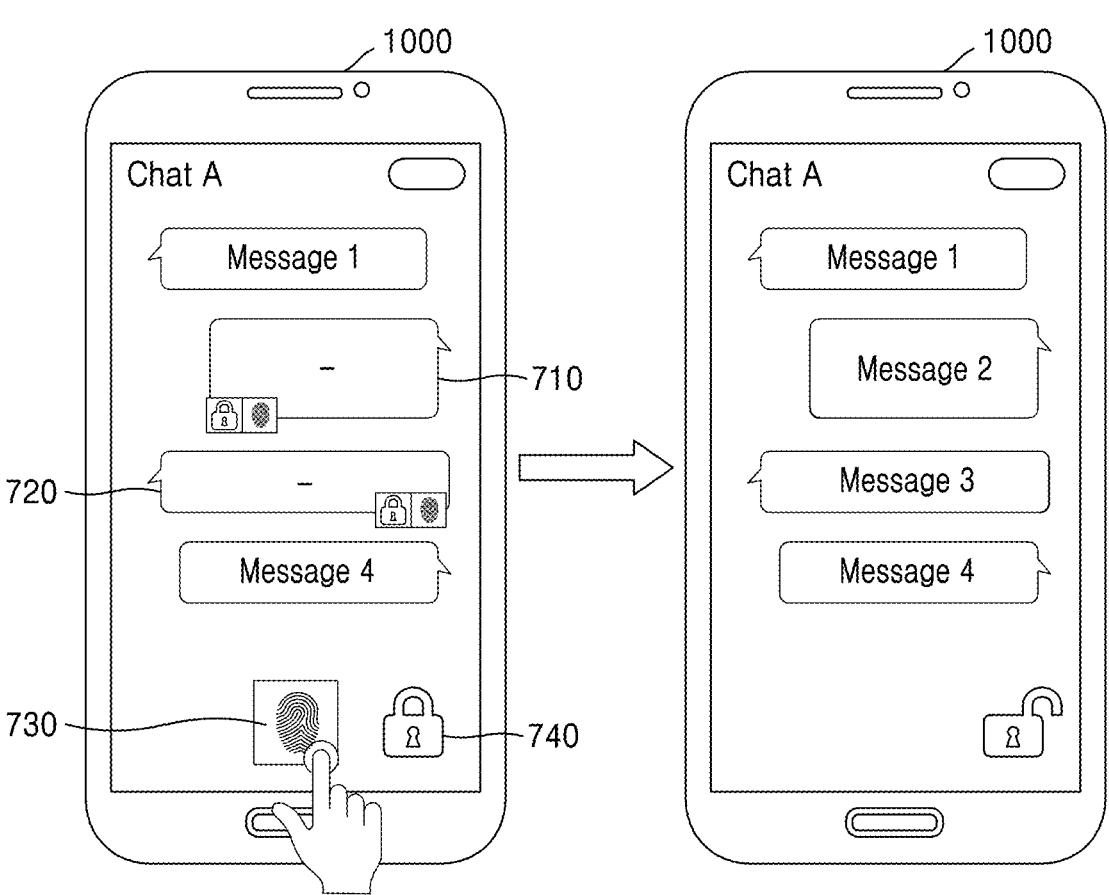
FIG. 7 shows a method of encrypting and decrypting a chat message in a device, according to an embodiment of the disclosure.

FIG. 7 shows a method of encrypting and decrypting a chat message in a device, according to an embodiment of the disclosure.

Referring to FIG. 7, content may be a chat message. The device 1000 may encrypt each chat message or decrypt each encrypted chat message, based on a user input.

Also, the device 1000 may encrypt a plurality of chat messages at once and decrypt a plurality of encrypted chat messages at once.

For example, according to reception of a user input of selecting a menu 740 for decrypting all encrypted messages on a chat window, the device 1000 drives a fingerprint sensor 730 based on encryption information stored in correspondence to encrypted chat messages 710 and 720, and decrypt the encrypted chat messages 710 and 720 based on a user's fingerprint image obtained through the fingerprint sensor 730.

Also, as another example, after chat messages are scrolled and thus the encrypted chat messages 710 and 720 appear on a chat window, the encrypted chat messages 710 and 720 may be displayed on the chat window for a reference time period, and in this case, the device 1000 may drive the fingerprint sensor 730 and decrypt the encrypted messages 710 and 720 based on a fingerprint image obtained through the fingerprint sensor 730.

Figure 8:
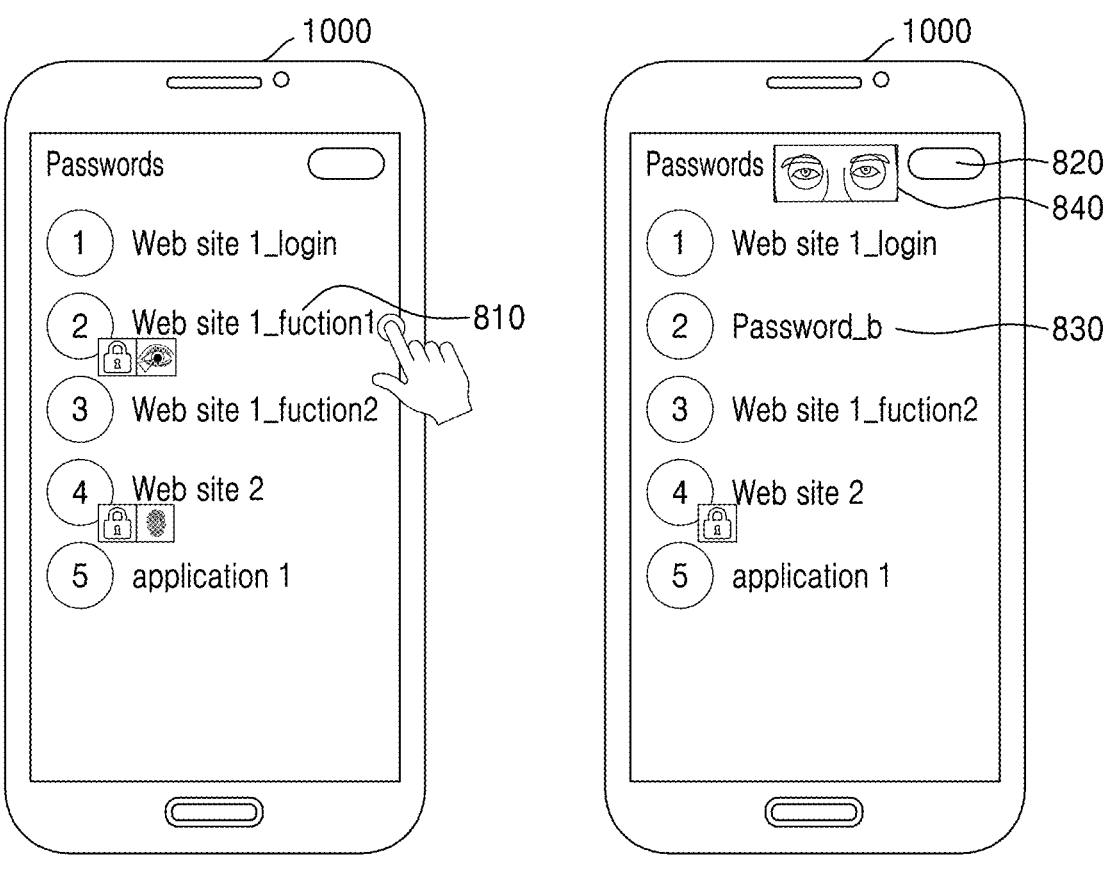
FIG. 8 shows a method of providing account information in a device, according to an embodiment of the disclosure.

FIG. 8 shows a method of providing account information in a device, according to an embodiment of the disclosure.

Referring to FIG. 8, the device 1000 may store account information of a website or application in correspondence to identification information of the website or application. The account information may include at least one of a user's ID or password.

For example, according to reception of a user input of selecting an account information storage menu while a website or application is executed, the device 1000 displays a user interface for storing account information. The device 1000 may receive a user input of inputting account information through the user interface, and store the input account information in correspondence to the identification information of the website or application. The identification information of the website or application may be input directly by a user, or the device 100 may obtain the identification information of the web site or application being executed.

In this case, the device 1000 may encrypt and store the account information based on the user's biometric information.

Also, according to reception of a user input for displaying a list of stored account information, the device 1000 may display a list of websites or applications in which account information is stored. According to reception of a user input of selecting one from the list of websites or applications, the device 1000 may display account information corresponding to the selected website or application.

The device 1000 may decrypt encrypted account information based on a user's biometric information.

For example, referring to FIG. 8, according to reception of a user input of selecting identification information Web site 1_fuction1 810 of a website with encrypted account information in the list of stored account information, the device 1000 drives an iris sensor 820 based on encryption information stored in correspondence to Web site 1_fuction1 810. Also, the device 1000 may display a user's iris image 840 obtained by the iris sensor 820.

The device 1000 may decrypt encrypted account information of Web site 1_fuction1 810 based on the iris image obtained by the iris sensor 820. According to the decryption of the encrypted account information of Web site 1_fuction1 810, the device 1000 may display account information 830 of Web site 1_fuction1 810.

Figure 9:
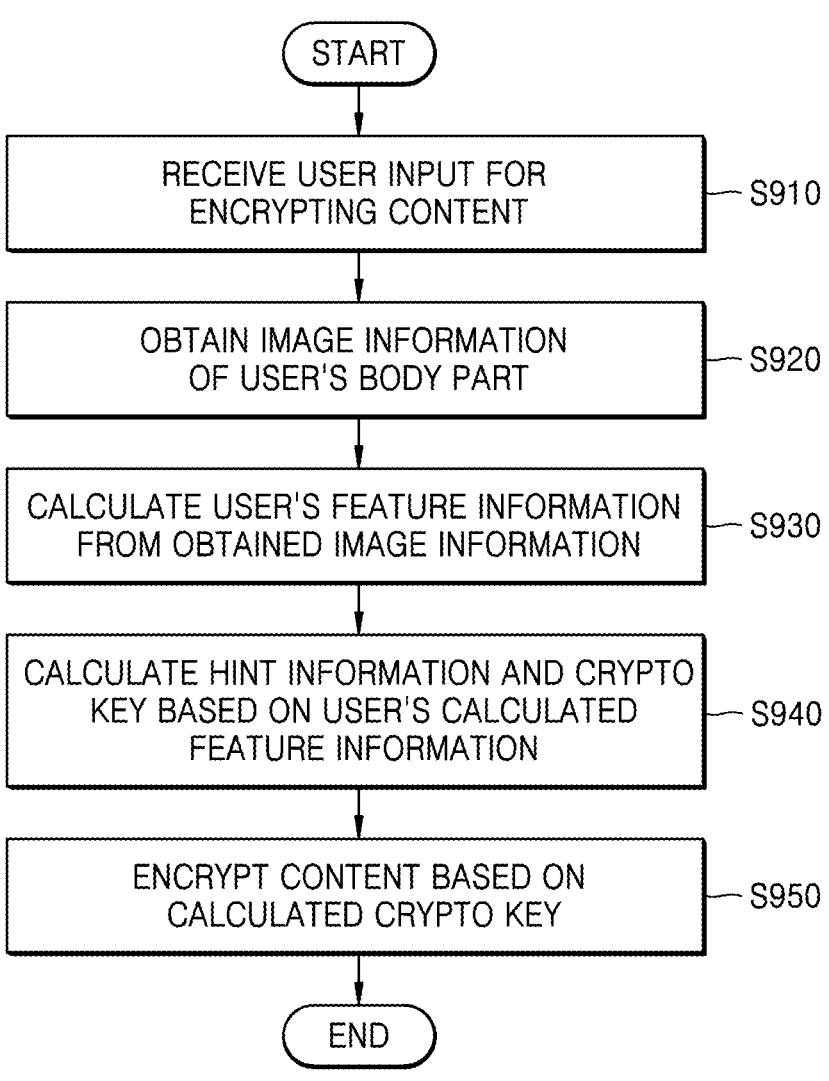
FIG. 9 is a flowchart illustrating a method of encrypting content in a device, according to an embodiment of the disclosure.

FIG. 9 is a flowchart illustrating a method of encrypting content in a device, according to an embodiment of the disclosure.

Referring to FIG. 9, in operation S910, the device 1000 may receive a user input for encrypting content.

According to an embodiment, the device 1000 may receive a user input of selecting an area of images displayed on a display of the device 1000 to encrypt content in the selected area.

In operation S920, the device 1000 may obtain image information of a user's body part.

For example, according to reception of a user input for encrypting content, the device 1000 displays identification information of a plurality of body parts capable of being used for encryption. Also, the device 1000 may receive a user input of selecting a body part from among the plurality of body parts. Also, the device 1000 may control a sensor corresponding to the selected body part to obtain image information of the selected body part.

In operation S930, the device 1000 may calculate the user's feature information from the obtained image information.

According to an embodiment, the device 1000 may identify whether the user is a true owner of the device 1000 based on the feature information. For example, the device 1000 stores a hash value of feature information in correspondence to the user's body part. According to the calculation of the user's feature information from the obtained image information, the device 1000 may compare a hash value of the calculated feature information to the stored hash value, thereby identifying whether the user is the true owner of the device 100. According to identification that the user is not the true owner of the device 1000, the device 1000 may display a message indicating that the content cannot be decrypted. Also, according to identification that the user is the true owner of the device 1000, the device 1000 may encrypt the content based on the calculated feature information. Accordingly, the device 1000 may encrypt the content, while authenticating the user.

In operation S940, the device 1000 may calculate hint information and a crypto key based on the user's calculated feature information. Operation S940 is described with reference to FIG. 2 or 15.

In operation S950, the device 1000 may encrypt the content based on the calculated crypto key.

For example, the device 1000 encrypts the content by storing encryption information as meta information of a file of the content. The encryption information may include information indicating that the file includes encrypted content, position information of data corresponding to the encrypted content in the file, hint information, information about a body part used for encryption, information about a sensor used in encryption, and information about a decryption method, although not limited thereto.

Also, according to an embodiment, the device 100 may encrypt the content based on image information of a plurality of users' body parts.

Figure 10:
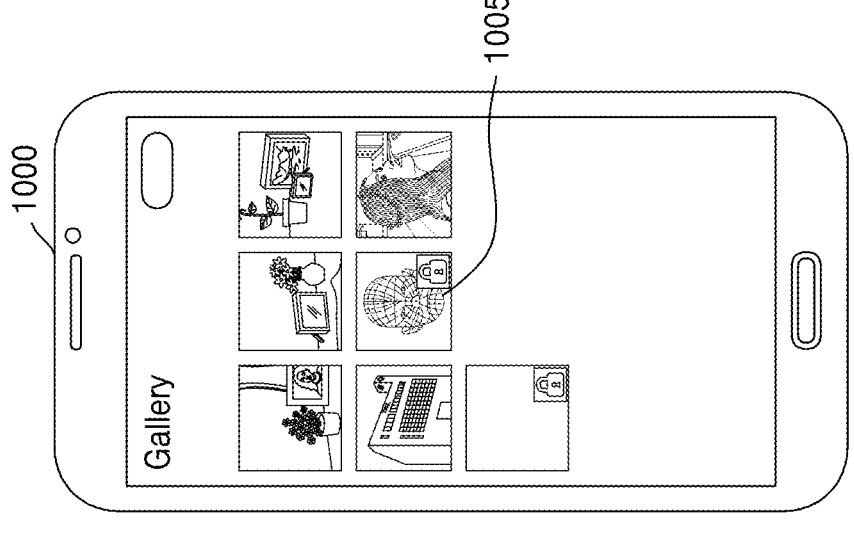
FIG. 10 shows a method of encrypting content in a device, according to an embodiment of the disclosure.
Figure 10:
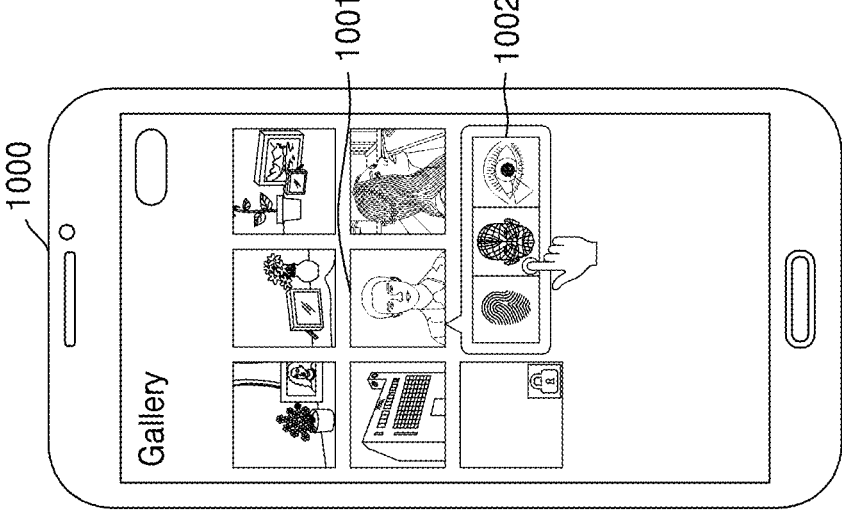

FIG. 10 shows a method of encrypting content in a device, according to an embodiment of the disclosure.

Referring to FIG. 10, the device 1000 may provide a menu for encrypting content.

For example, according to reception of a user input of touching and holding one piece of content 1001 among a plurality of pieces of content, the device 1000 displays a menu 1002 for encrypting content. The menu 1002 for encrypting content may include a list of a user's body parts that are to be used for encryption.

According to reception of a user input of selecting face in the list of body parts, the device 1000 may drive a sensor corresponding to the face and display guide information 1003 for obtaining a face image.

The device 1000 may obtain a user's face image through the sensor 1006. Also, the device 1000 may display an image 1004 indicating that encryption is in progress on the content 1001 to be encrypted.

The device 1000 may obtain the user's feature information from the user's face image, calculate hint information and a crypto key based on the obtained feature information, and encrypt the content 1001 based on the calculated crypto key. Also, the device 1000 may store encryption information including the hint information in correspondence to the encrypted content.

According to the encryption of the content 1001, the device 1000 may display identification information of the encrypted content. In this case, the device 1000 may display a body part image 1005 used for encryption, as the identification information of the encrypted content.

Figure 11:
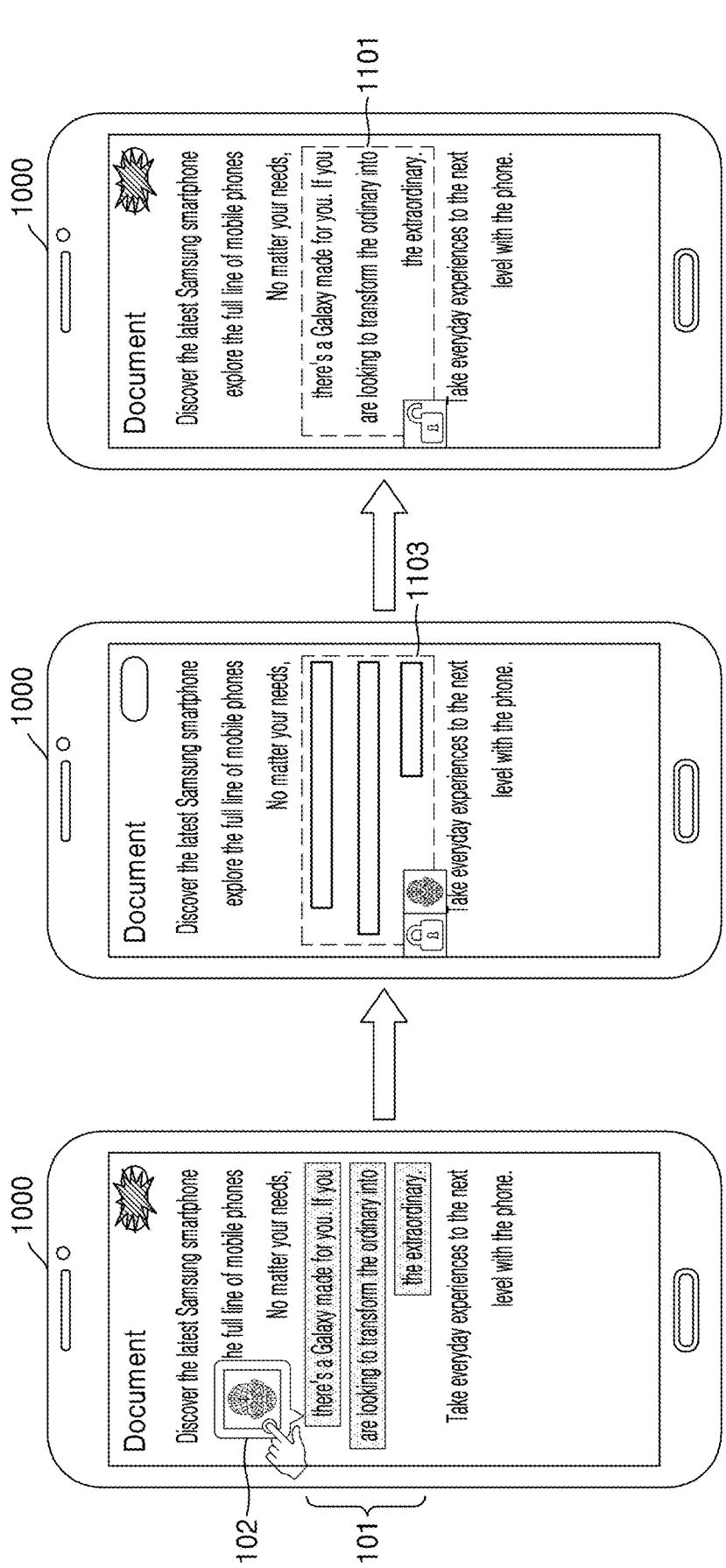
FIG. 11 shows a method of encrypting and decrypting a part of text content in a device, according to an embodiment of the disclosure.

FIG. 11 shows a method of encrypting and decrypting a part of text content in a device, according to an embodiment of the disclosure.

Referring to FIG. 11, the device 1000 may display text content. The text content may be content stored in a form of a text file, or content stored in a form of a web page.

Also, the device 1000 may receive a user input of selecting a part of the text content to encrypt the selected part. For example, according to selection of a text 1101 in the text content, the device 1000 displays an encryption icon 1102.

According to reception of a user input of selecting the encryption icon 1102, the device 1000 may calculate hint information and a crypto key based on a user's body part image (e.g., a face image) obtained through a sensor, and encrypt the selected text 1101 based on the calculated crypto key.

Also, the device 1000 may store encryption information for the selected text 1101 in correspondence to the text 1101. For example, according to the text content being content in a form of a file, the device 1000 stores encryption information for the text 1101 as meta information of the text content file. The encryption information may include start and end positions of the text 1101 in the text content file.

Also, as another embodiment, the device 1000 may generate an encryption file including the text 1101 and the encryption information for the text 1101.

According to encryption of the selected text 1101, the device 1000 may display the text content such that the selected text 1101 is not shown. For example, the device 1000 displays an area corresponding to the encrypted text 1101 as an empty area 1103.

Also, the device 1000 may display an icon representing an area where text has been encrypted and identification information of a body part used for encryption.

Also, the device 1000 may hide, even when closing the text content file and then again opening the text content file, the text 110 based on the encryption information stored in the meta information of the text content file.

The device 1000 may receive a user input for decrypting the encrypted text 1101. For example, according to reception of a user input of selecting the empty area 1103 corresponding to the encrypted text 1101, the device 1000 calculates a crypto key based on a user's body part image (e.g., a face image) obtained through a sensor and the hint information in the text content file, and decrypt the selected, encrypted text 1101 based on the calculated crypto key. Also, the device 1000 may display the text 1101.

Also, as another example, after texts are scrolled and thus the empty area 1103 corresponding to the encrypted text 1101 appears on a screen of the device 1000, the empty area 1103 corresponding to the encrypted text 1101 may be displayed on the screen for a reference time period, and in this case, the device 1000 may drive a sensor and decrypt the encrypted text 1101 based on a body part image obtained through the sensor. Also, the device 1000 may display the text 1101.

Figure 12:
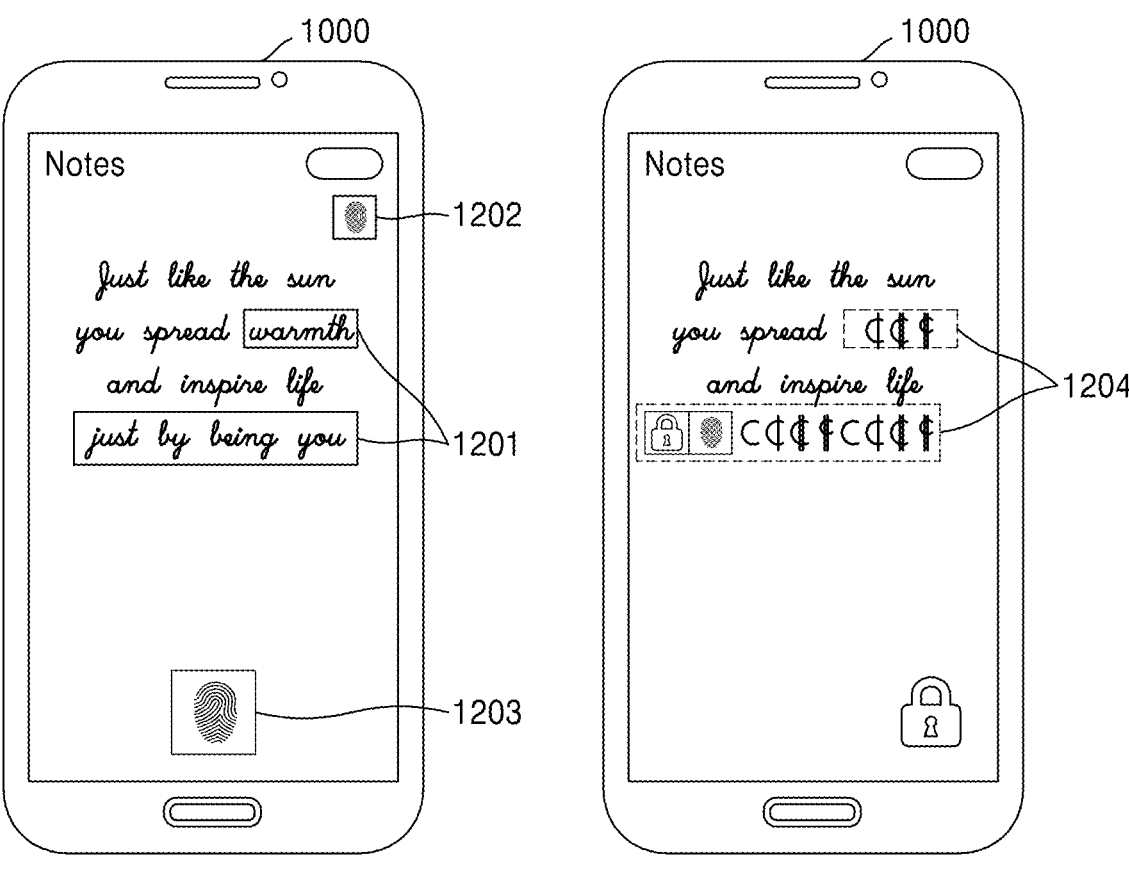
FIG. 12 shows a method of encrypting and decrypting a part of image content in a device, according to an embodiment of the disclosure.

FIG. 12 shows a method of encrypting and decrypting a part of image content in a device, according to an embodiment of the disclosure.

Referring to FIG. 12, the device 1000 may display image content. The image content may be content stored in a form of an image file.

The device 1000 may receive a user input of selecting content to be encrypted in the displayed image content. For example, according to reception of a user input of selecting an encryption menu 1202, the device 1000 displays a graphical user interface (GUI) for selecting an encryption area. The GUI for selecting the encryption area may be a GUI in a form of a rectangle of which the size and shape are adjustable.

Also, the device 1000 may receive a user input of selecting an area 1201 of the displayed image content. For example, the device 1000 receives a user input of selecting an encryption area by using the GUI.

The device 1000 may receive a user input for encrypting content of the selected area 1201. For example, the device 1000 receives a user input of inputting a fingerprint to a fingerprint sensor 1203.

According to the reception of the user input for encrypting the content of the area 1201, the device 1000 may calculate hint information and a crypto key based on a user's body part image (e.g., a fingerprint image) obtained through a sensor, and encrypt the content of the selected area 1201 based on the calculated crypto key.

Also, the device 1000 may store encryption information for the content of the selected area 1201 in correspondence to the image content. For example, according to the image content being content in a form of a file, the device 1000 stores the encryption information for the content of the area 1201 as meta information of the image content file. The encryption information may include position information of the selected area 1201 in the image content.

According to the encryption of the content of the selected area 1201, the device 1000 may display the area 1204 as an empty area. Also, as shown in FIG. 12, the device 1000 may display user information on an area 1204. The user information may be selected by a user, and include at least one of an image, an icon, a signature, or a text, although not limited thereto.

Also, the device 1000 may display an icon representing an area of encrypted content and identification information of the body part used for encryption.

Also, the device 1000 may hide, even when closing the image content file and then again opening the image content file, the image of the area 1201 based on the encryption information stored in the meta information of the image content file.

The device 1000 may receive a user input for decrypting the content of the encrypted area 1204. For example, according to reception of a user input of selecting the encrypted area 1204, the device 1000 calculates a crypto key based on a user's body part image (e.g., a face image) obtained through a sensor and the hint information in the image content file, and decrypt content of the encrypted area 1204 based on the calculated crypto key. Also, according to the decryption of the content of the encrypted area 1204, the device 1000 may display the content of the area 1204.

Figure 13:
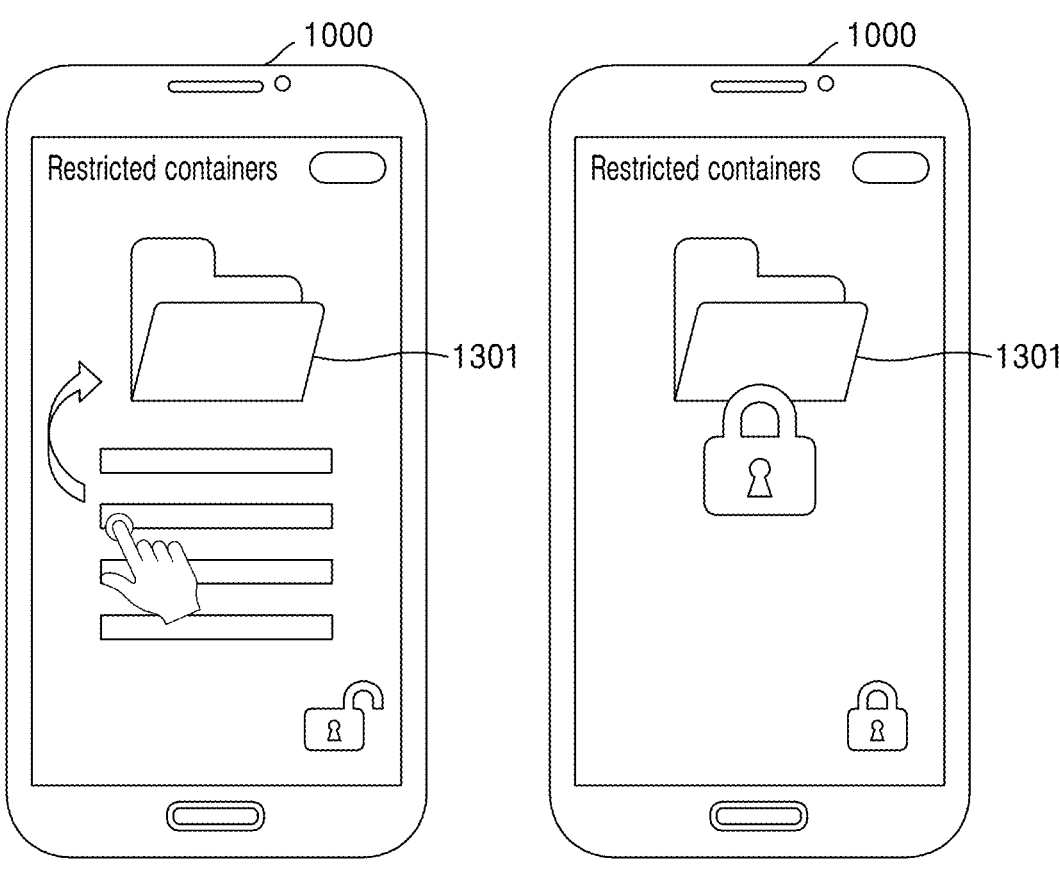
FIG. 13 shows a method of encrypting and decrypting content by using an encryption container in a device, according to an embodiment of the disclosure.

FIG. 13 shows a method of encrypting and decrypting content by using an encryption container in a device, according to an embodiment of the disclosure.

Referring to FIG. 13, the device 1000 may receive a user input for generating an encrypted container 1301.

Also, the device 1000 may receive a user input of selecting content and dragging and dropping the content to put the content into the encrypted container 1301. According to the reception of the user input of dragging and dropping the selected content into the encrypted container 1301, the device 1000 may encrypt the content.

For example, according to the reception of the user input of dragging and dropping the content to put the content into the encrypted container 1301, the device 1000 encrypts the selected content based on a user's body part image obtained through a preset sensor. Also, the device 1000 may delete the selected content and store the encrypted content as content belonging to the encrypted container 1301.

Also, according to reception of a user input of selecting the encrypted container 1301, the device 1000 may decrypt all encrypted content included in the encrypted container 1301 and display a list of the decrypted content. For example, according to reception of a user input of selecting the encrypted container 1301, the device 1000 decrypts all the encrypted content included in the encrypted container 1301 based on a user's body part image obtained through a preset sensor.

Also, as another embodiment, according to reception of a user input of selecting the encrypted container 1301, the device 1000 may display a list of encrypted content. Also, according to reception of a user input of selecting one from the list of encrypted content, the device 1000 may decrypt the selected, encrypted content.

According to reception of a user input of selecting one from the list of encrypted content included in the encrypted container 1301 and moving the selected content out of the encrypted container 1301, the device 1000 may change the selected content to unencrypted content. For example, the device 1000 deletes encryption information from a file of the encrypted content.

Figure 14:
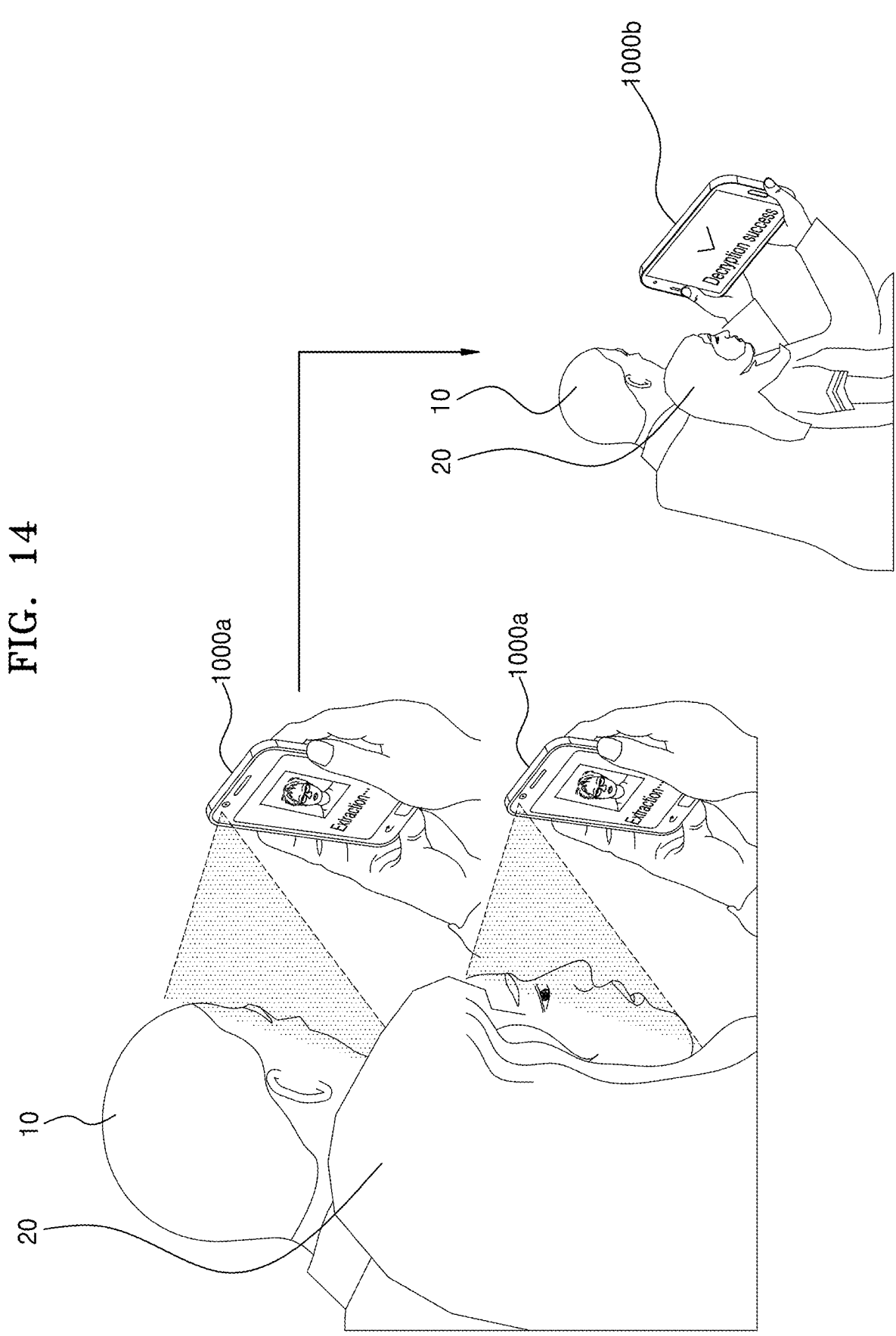
FIG. 14 shows a method of encrypting and decrypting content by using biometric information of a plurality of users in a device, according to an embodiment of the disclosure.

FIG. 14 shows a method of encrypting and decrypting content by using a plurality of users' biometric information in a device, according to an embodiment of the disclosure.

Referring to FIG. 14, content may be encrypted and decrypted by using a plurality of users' biometric information.

For example, a first device 1000a receives a user input of selecting content to be encrypted. Also, the first device 1000a may receive a user input of selecting the number of users to participate in encryption as two. Also, the first device 1000a may receive a user input for encrypting the selected content.

According to the reception of the user input for encrypting the selected content, the first device 1000a may display a message requesting to photograph a user's face. According to obtaining of a face image of a first user 10, the first device 1000a may display a message requesting to photograph another user's face. The first device 1000a may obtain a face image of a second user 20.

The first device 1000a may calculate feature information of the first user 10 based on the face image of the first user 10. The first device 1000a may calculate feature information of the second user 20 based on the face image of the second user 20. The first device 1000a may calculate a crypto key and hint information based on the feature information of the first user 10 and the feature information of the second user 20. The first device 1000a may encrypt the selected content based on the calculated crypto key. For example, the first device 1000a stores encryption information as meta information of a file including the selected content.

According to reception of a user input of selecting encrypted content after the encrypted content moves to the second device 1000b, the second device 1000b may identify that the content has been encrypted based on the encryption information. Also, the second device 1000b may identify that the content can be decrypted based on two users' biometric information, based on the encryption information.

According to the identification that the content can be decrypted based on two users' biometric information, the second device 1000b may display a message requesting to photograph a user's face. The second device 1000b may control a sensor to obtain a face image of the first user 10, based on the user's body part information and sensor information included in the encryption information. According to the obtaining of the face image of the first user 10, the second device 1000b may display a message requesting to photograph another user's face. The second device 1000b may obtain a face image of the second user 20.

Also, the second device 1000b may calculate feature information of the first user 10 and feature information of the second user 20 based on the face image of the first user 10 and the face image of the second user 20, and decrypt the crypto key based on the calculated feature information and the hint information included in the encryption information. According to the decryption of the crypto key, the second device 1000b may decrypt the encrypted content based on the decrypted crypto key. According to the decryption of the encrypted content, the second device 1000b may display the encrypted content.

Figure 15:
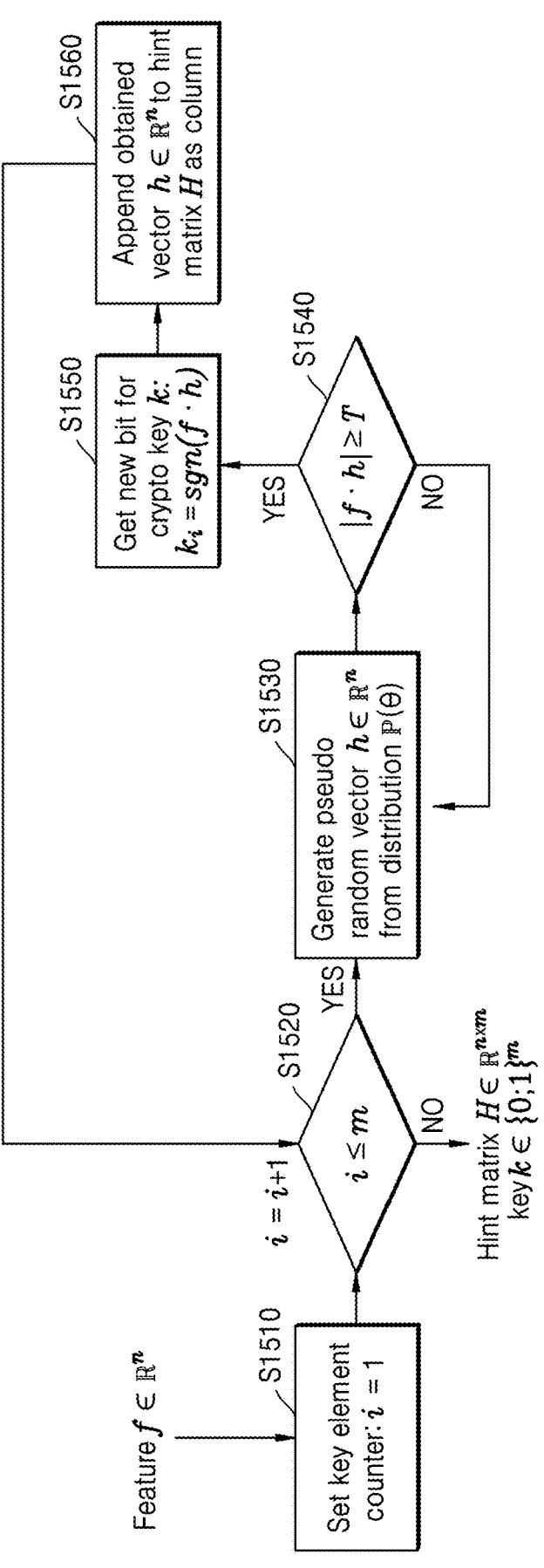
FIG. 15 is a flowchart illustrating a method of generating hint information and a crypto key based on feature information in a device, according to an embodiment of the disclosure.

FIG. 15 is a flowchart illustrating a method of generating hint information and a crypto key based on feature information in a device, according to an embodiment of the disclosure.

Referring to FIG. 15, in operation S1510, the device 1000 may obtain feature information.

The feature information may be a n-dimensional feature vector f. Also, the device 1000 may set a key element counter i to 1. The key element counter i may mean an order of a crypto key.

In operation $1520, the device 1000 may identify whether or not i is smaller than or equal to m.

m may mean the number of columns of a hint matrix or the number of elements of a crypto key.

According to i being smaller than or equal to m in operation S1520, the device 1000 may generate a pseudo random vector h from distribution P(θ), in operation S1530.

Distribution P(θ) may be probability distribution having parameters. For example, distribution P(θ) is normal distribution N(0,1).

The pseudo random vector h may be a n-dimensional vector.

In operation S1540, the device 1000 may identify whether or not an absolute value of a dot product of the feature vector f and the pseudo random vector h is greater than or equal to a threshold value T.

According to the absolute value of the dot product being greater than or equal to the threshold value in operation S1540, the device 1000 may set a sign of the dot product of f and h to an i-th element of the crypto key, in operation S1550.

Also, according to the absolute value of the dot product being smaller than the threshold value T in operation S1540, the device 1000 may identify that the pseudo random vector is not an effective pseudo random vector, and generate a new pseudo random vector h from distribution P(θ) in operation S1530.

In operation S1560, the device 1000 may set the pseudo random vector h to hint information corresponding to an i-th element ki of the crypto key, and append the n-dimensional vector h to a hint matrix H, as an i-th column of the hint matrix H.

In operation S1520, the key element counter i may increase by 1. According to i being smaller than or equal to m, operation S1530 may be again performed, and according to i being greater than m, a n×m-dimensional hint matrix H may be set to hint information. Also, the device 1000 may set a key k having m elements to a crypto key. In this case, elements of the crypto key may be 0 or 1.

Accordingly, the device 1000 may calculate the crypto key k and the hint matrix H such that the i-th element of the crypto key is related to the i-th column of the hint matrix.

Figure 16:
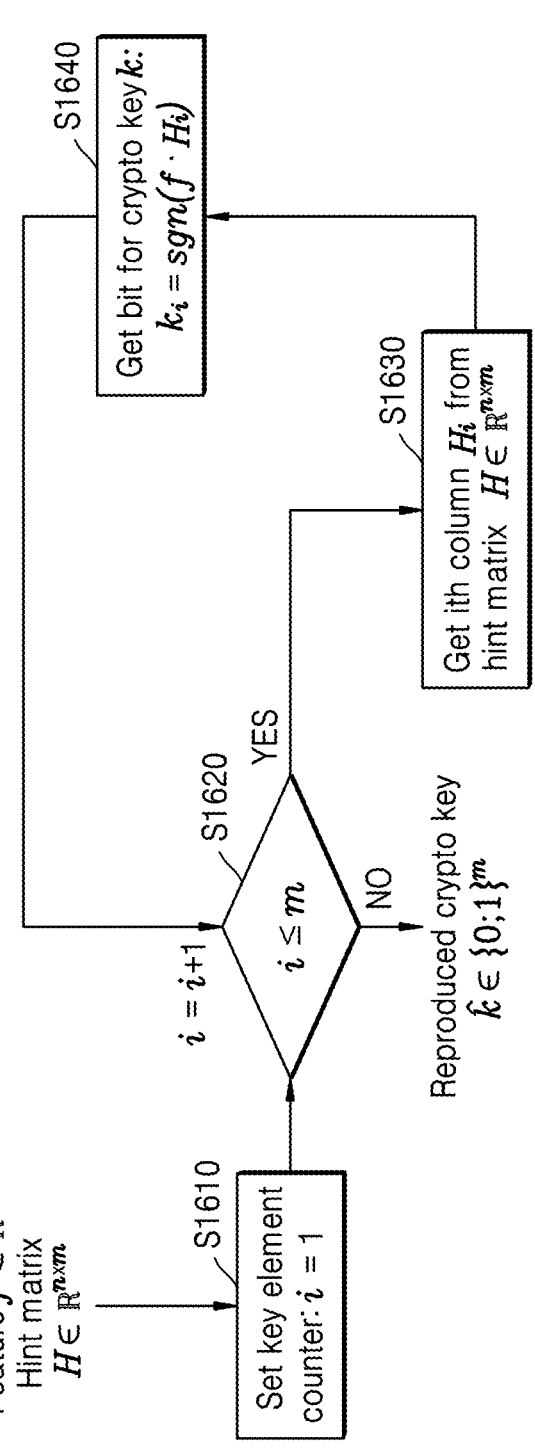
FIG. 16 is a flowchart illustrating a method of reproducing a crypto key based on feature information and hint information in a device, according to an embodiment of the disclosure.

FIG. 16 is a flowchart illustrating a method of reproducing a crypto key based on feature information and hint information in a device, according to an embodiment of the disclosure.

Referring to FIG. 16, in operation S1610, the device 1000 may obtain feature information and a hint matrix.

The feature information may be a n-dimensional feature vector f. Also, the hint matrix may be a n×m-dimensional matrix.

Also, the device 1000 may set a key element counter i to 1. The key matrix counter i may mean an order of a crypto key to be reproduced.

In operation S1620, the device 1000 may identify whether or not i is smaller than or equal to m.

m may be the number of columns of the hint matrix, and means the number of elements of the crypto key.

According to i being smaller than or equal to m in operation S1620, the device 1000 may obtain $H_i$ which is an i-th column of the hint matrix.

In operation S1630, the device 1000 may regenerate a sign of a dot product of the feature vector f and $H_i$ obtained in operation S1620 as an i-th element of a crypto key.

According to the feature vector f being identical to the feature vector used in encryption of FIG. 15, the regenerated element of the crypto key may be identical to the i-th element of the crypto key generated in FIG. 15. However, according to the feature vector f being not identical to the feature vector used in encryption of FIG. 15, the regenerated element of the crypto key may be different from the i-th element of the crypto key generated in FIG. 15.

The key element counter i may again increase by 1. According to i being smaller than or equal to m, the device 1000 may again perform operation S1630, and according to i being greater than m, the device 1000 may set m calculated elements to a crypto key.

Therefore, according to the feature information upon decryption of FIG. 16 being identical to the feature information upon encryption of FIG. 15, the device 1000 may reproduce the i-th element of the crypto key based on the i-th column of the hint matrix and the feature information.

Figure 17:
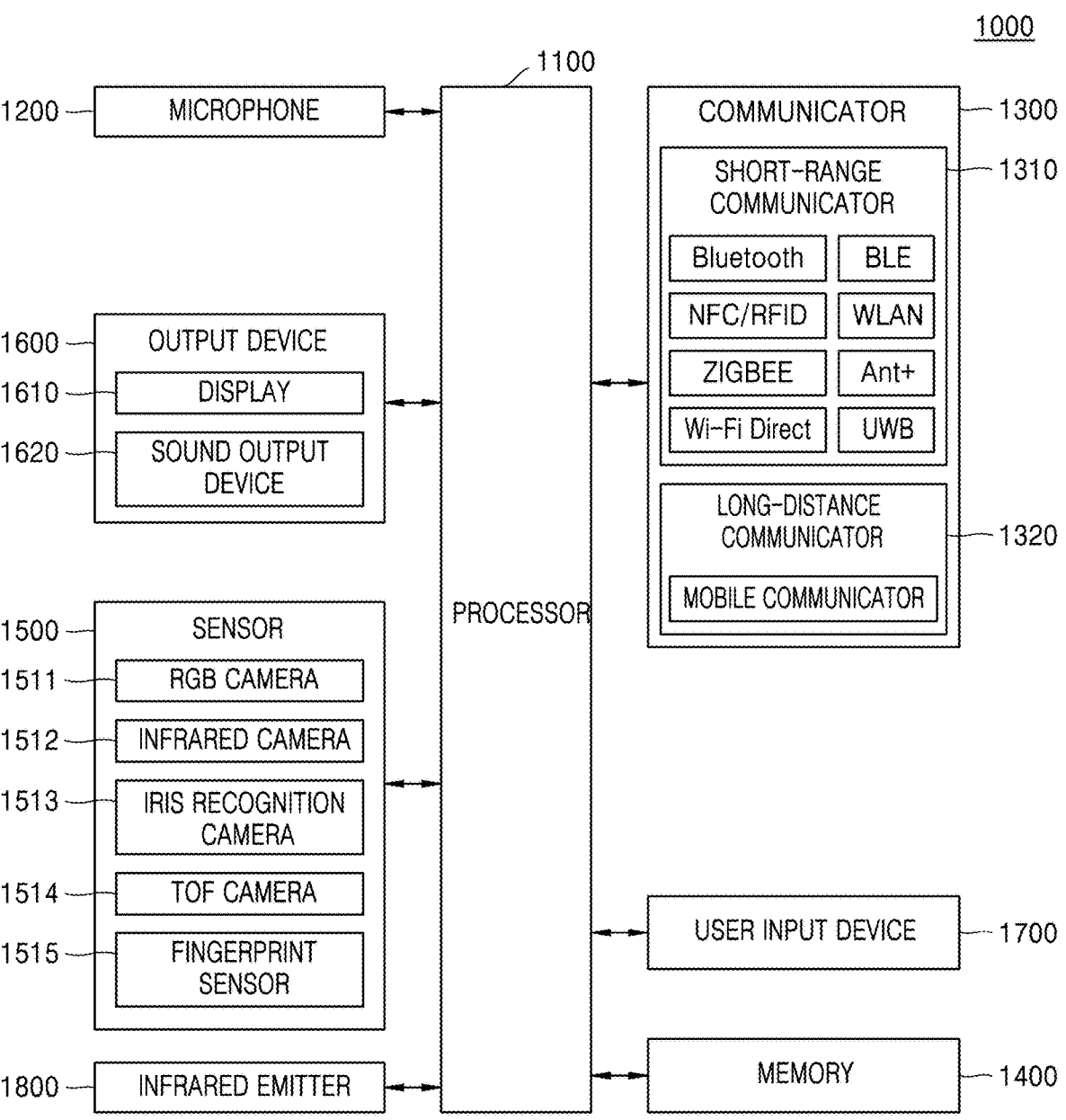
FIG. 17 shows a block diagram of a device according to an embodiment of the disclosure.

FIG. 17 shows a block diagram of a device according to an embodiment of the disclosure.

Referring to FIG. 17, the device 1000 may include a processor 1100, a microphone 1200, a communicator 1300, memory 1400, a sensor 1500, an output device 1600, a user input device 1700, and an infrared emitter 1800.

All of shown components may not be essential components of the device 1000. The device 1000 may be configured with more components than those shown in FIG. 17 or with less components than those shown in FIG. 17. For example, the device 1000 is implemented by the processor 1100, the memory 1400, the sensor 1500, the output device 1600, the user input device 1700, and the infrared emitter 1800.

The processor 1100 may control overall operations of the device 1000. The processor 1100 may execute a program stored in the memory 1400 to control components of the device 1000.

According to an embodiment, the processor 1100 may include a neural processing unit (NPU) for performing operations of a machine-learning model. Also, the processor 1100 may include a central processing unit (CPU), a graphics processing unit (GPU), etc.

According to an embodiment, the processor 1100 may include a hardware structure (e.g., a neural network processor) specialized for processing of an artificial intelligent model. The artificial intelligent model may be generated through machine learning. The learning is performed, for example, in the device 1000 in which an artificial intelligent model is performed, or through a separate server (not shown).

A learning algorithm includes, for example, supervised learning, unsupervised learning, semi-supervised learning, or reinforcement learning, although not limited to these examples. The artificial intelligent model may include a plurality of artificial neural network layers. The artificial intelligence model may additionally or alternatively include a software structure, in addition to a hardware structure.

The microphone 1200 may receive a user's voice command or voice request. Accordingly, the processor 1100 may perform a control of performing an operation corresponding to a voice command or a voice request. Also, the microphone 1200 may receive sound around the device 1000.

The processor 1100 may receive a voice command for encrypting or decrypting content through the microphone 1200.

The communicator 1300 may transmit/receive information, image signals, or audio signals to/from a source device (not shown) or an external server 2000 according to a protocol under a control by the processor 1100. The communicator 1300 may include at least one communication module and at least one port for transmitting/receiving data to/from an external device (not shown).

Also, the communicator 1300 may communicate with an external device through at least one wired or wireless communication network. The communicator 1300 may include at least one of a short-range communicator 1310 or a long-distance communicator 1320, or a combination thereof. The communicator 1300 may include at least one antenna for wireless communication with another device.

The short-range communicator 1310 may include at least one communication module (not shown) that performs communication according to a communication standard, such as Bluetooth, Wireless Fidelity (Wi-Fi), Bluetooth Low Energy (BLE), Near Field Communication/Radio Frequency Identification (RFID), Wi-Fi Direct, Ultra Wideband (UWB), or ZIGBEE. Also, the long-distance communicator 1320 may include a communication module (not shown) that performs communication through a network for Internet communication. Also, the long-distance communicator 1320 may include a mobile communicator that performs communication according to a communication standard, such as $3^{rd}$ Generation (3G), $4^{th}$ Generation (4G), $5^{th}$ Generation (5G), and/or $6^{th}$ Generation (6G).

Also, the communicator 1300 includes a communication module capable of receiving control commands from a remote controller (not shown) located nearby, for example, an infrared (IR) communication module.

The memory 1400 may store various information, data, instructions, programs, etc. required for operations of the device 1000. The memory 1400 may include at least one of volatile memory or non-volatile memory, or a combination thereof. The memory 1400 may include at least one kind of storage medium among flash memory type, a hard disk type, a multimedia card micro type, card type memory (e.g., Secure Digital (SD) or extreme Digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, or an optical disk. Also, the device 1000 may operate a web storage or cloud server that performs a storage function on the Internet.

The sensor 1500 may detect a feature of a user's body part.

The sensor 1500 may include at least one of an RGB camera 1511, an infrared camera 1512, an iris recognition camera 1513, a ToF camera 1514, or a fingerprint sensor 1515, although not limited thereto.

The infrared emitter 1800 may include an infrared laser projector (not shown) and a Light Emitting Diode (LED) (not shown), although not limited thereto.

The processor 1100 may control the infrared laser projector (not shown) to irradiate infrared laser onto a user's face. Also, the processor 1100 may control the infrared LED to emit infrared light onto a user's iris.

The output device 1600 may include a display 1610 and a sound output device 1620, although not limited thereto.

The display 1610 may output image data image-processed by an image processor (not shown) through a display panel (not shown), according to a control by the processor 1100. The display (not shown) may include at least one among a liquid crystal display (LCD), a thin film transistor-liquid crystal display, an organic light-emitting diode (OLED), a flexible display, a 3D display, or an electrophoretic display.

The sound output device 1620 may output a sound signal to outside of the device 1000. The sound output device 1620 may include, for example, a speaker or a receiver. The speaker may be used for general purposes, such as multimedia playback or recording playback. The receiver may be used to receive incoming calls.

The user input device 1700 may receive a user input for controlling the device 1000. The user input device 1700 may include a key (not shown), a touch screen (not shown), etc. The user input device 1700 may receive a user input and transfer the user input to the processor 1100.

The user input device 1700 may include a touch panel that detects a user's touch, a button that receives a user's push operation, a wheel that receives a user's rotation operation, a keyboard, a dome switch, etc., although not limited thereto.

Also, the user input device 1700 may include a motion detection sensor (not shown). For example, the motion detection sensor (not shown) detects a motion of the device 1000, and receive the detected motion as a user input.

As used in various embodiments of the document, the term "module" or "portion" may include a unit implemented in hardware, software, or firmware, and may be used interchangeably with terms, such as, for example, logic, logical block, component, or circuit. The module may be an integrated component, or a minimum unit of the component or a part thereof, which performs one or more functions. For example, according to an embodiment, the module may be implemented in a form of an application-specific integrated circuit (ASIC).

The processor 1100 may control the display 1610 to display identification information of encrypted content. The processor 1100 may control the display 1610 to display, as the identification information of the encrypted content, identification information of a body part used for encryption of the encrypted content.

The processor 1100 may control the user input device 1700 to receive a user input of selecting the encrypted content.

According to the reception of the user input of selecting the encrypted content, the processor 1100 may control the sensor 1500 to obtain image information of a user's body part.

According to the reception of the user input of selecting the encrypted content, the processor 1100 may obtain information about a sensor from a file including the encrypted content. Also, the processor 1100 may control the sensor 1500 to obtain an image of the user's body part.

The processor 1100 may calculate feature information of the user's body part from the obtained image information. The processor 1100 may reproduce a crypto key based on the user's calculated feature information and hint information stored in correspondence to the encrypted content. The processor 1100 may decrypt the encrypted content based on the reproduced crypto key. For example, the processor 1100 identifies whether the user who has selected the encrypted content is a user who has encrypted the content, based on the crypto key, and according to identification that the user who has selected the encrypted content is the user who has encrypted the content, the processor 1100 may obtain data of the encrypted content from the file of the encrypted content.

According to the decryption of the encrypted content, the processor 1100 may control the display 1610 to display the encrypted content. The processor 1100 may control the display 1610 to display the encrypted content based on the obtained data.

Also, according to an embodiment, the processor 1100 may control the user input device 1700 to receive a user input of selecting a folder including at least one piece of encrypted content. According to the reception of the user input of selecting the folder, the processor 1100 may control the sensor 1500 to obtain image information of a user's body part. Also, the processor 1100 may decrypt the at least one piece of encrypted content based on the obtained image information.

The processor 1100 may control the user input device 1700 to receive a user input for encrypting content. For example, the processor 1100 controls the user input device 1700 to receive a user input of selecting an area of an image displayed on the display 1610 to encrypt content in the selected area.

Also, the processor 1100 may control the sensor 1500 to obtain image information of a user's body part. For example, according to the reception of the user input for encrypting the content, the processor 1100 controls the display 1610 to display identification information of a plurality of body parts capable of being used for encryption. The processor 1100 may control the user input device 1700 to receive a user input of selecting a body part from among the plurality of body parts. The processor 1100 may control the sensor 1500 corresponding to the selected body part to obtain image information of the selected body part.

The processor 1100 may calculate feature information from the obtained image information.

The processor 1100 may identify whether the user who has selected the content is an owner of the device, based on the feature information, and according to identification that the user who has selected the content is not the owner of the device, the processor 1100 may control the display 1610 to display a message indicating that the content cannot be encrypted.

According to identification that the user who has selected the content is the owner of the device, the processor 1100 may calculate a crypto key and hint information related to the crypto key, based on the feature information, and encrypt the content based on the crypto key. Also, the processor 1100 may store the hint information in correspondence to the encrypted content.

The machine-readable storage medium may be provided in the form of a non-transitory storage medium. The term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' includes a buffer in which data is temporarily stored.

According to an embodiment, the method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store or between two user devices (e.g., smart phones) directly. When distributed online, at least part of the computer program product (e.g., a downloadable app) may be temporarily generated or at least temporarily stored in the machine-readable storage medium, such as memory of the manufacturer's server, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a device of protecting content by using biometric information, the method comprising:
   displaying, by the device, identification information of encrypted content;
   receiving, by the device, a user input of selecting the encrypted content;
   controlling, by the device, according to the reception of the user input of selecting the encrypted content, a sensor to obtain image information of a user's body part;
   calculating, by the device, feature information of the user's body part from the obtained image information;
   reproducing, by the device, a crypto key based on the calculated feature information of the user's body part and hint information stored in correspondence to the encrypted content;
   decrypting, by the device, the encrypted content based on the reproduced crypto key; and
   displaying, by the device, the encrypted content according to the decryption of the encrypted content,
   wherein the hint information is included, as meta information of a file including the encrypted content, in the file.

2. The method of claim 1, wherein the obtaining of the image information of the user's body part according to the reception of the user input of selecting the encrypted content comprises:
   obtaining, according to the reception of the user input of selecting the encrypted content, information about the sensor from the file including the encrypted content; and
   controlling the sensor to obtain an image of the user's body part.

3. The method of claim 1, wherein the displaying of the identification information of the encrypted content comprises:
   displaying, as the identification information of the encrypted content, identification information of the user's body part used for encryption of the encrypted content.

4. The method of claim 1, further comprising:
   receiving a user input of selecting a folder including at least one piece of encrypted content;
   controlling, according to the reception of the user input of selecting the folder, the sensor to obtain the image information of the user's body part; and
   encrypting the at least one piece of encrypted content based on the obtained image information.

5. The method of claim 1, comprising:
   receiving a user input for encrypting content;
   obtaining the image information of the user's body part according to the reception of the user input for encrypting content;
   calculating the feature information from the obtained image information;
   calculating the crypto key and the hint information related to the crypto key based on the feature information;

encrypting the content based on the crypto key; and storing the hint information in correspondence to the encrypted content.

6. The method of claim 5, wherein the obtaining of the image information of the user's body part according to the reception of the user input for encrypting the content comprises:

displaying identification information of a plurality of body parts capable of being used for encryption, according to the reception of the user input for encrypting the content;

receiving a user input of selecting a body part from among the plurality of body parts; and controlling the sensor corresponding to the selected body part to obtain image information of the selected body part.

7. The method of claim 5, further comprising:

identifying whether a user is an owner of the device, based on the feature information; and displaying, according to identification that the user is not the owner of the device, a message indicating that the content cannot be encrypted.

8. The method of claim 5, wherein the receiving of the user input for encrypting the content comprises:

selecting an area in an image displayed on a display of the device; and receiving a user input for encrypting the content in the selected area.

9. The method of claim 5, wherein the encrypted content is content encrypted based on image information of a first user's body part and image information of a second user's body part, and wherein the controlling of the sensor to obtain the image information of the user's body part comprises:

controlling the sensor to obtain the image information of the first user's body part and the image information of the second user's body part.

10. The method of claim 1, further compromising:

storing a hash value of feature information corresponding to the user's body part.

11. A device for protecting content by using biometric information, the device comprising:

a sensor;

memory storing one or more computer programs; and one or more processors communicatively coupled to the sensor and the memory, wherein the one or more computer programs include computer-executable instructions that, when executed by the one or more processors, cause the device to:

display identification information of encrypted content, receive a user input of selecting the encrypted content, control the sensor to obtain image information of a user's body part according to the reception of the user input of selecting the encrypted content, calculate feature information of the user's body part from the obtained image information, reproduce a crypto key based on the calculated feature information of the user's body part and hint information stored in correspondence to the encrypted content, decrypt the encrypted content based on the reproduced crypto key, and display the encrypted content according to the decryption of the encrypted content, and wherein the hint information is included, as meta information of a file including the encrypted content, in the file.

12. The device of claim 11, wherein the one or more computer programs further include computer-executable instructions that, when executed by the one or more processors, cause the device to:

obtain, according to a user input of selecting the encrypted content, information about the sensor from the file including the encrypted content, and control the sensor to obtain an image of the user's body part.

13. The device of claim 11, wherein the one or more computer programs further include computer-executable instructions that, when executed by the one or more processors, cause the device to display, as identification information of the encrypted content, identification information of the user's body part used for encryption of the encrypted content.

14. The device of claim 11, wherein the one or more computer programs further include computer-executable instructions that, when executed by the one or more processors, cause the device to:

receive a user input of selecting a folder including at least one piece of encrypted content, control, according to the reception of the user input of selecting the folder, the sensor to obtain image information of the user's body part, and decrypt the at least one piece of encrypted content based on the obtained image information.

15. The device of claim 11, wherein the one or more computer programs further include computer-executable instructions that, when executed by the one or more processors, cause the device to:

receive a user input for encrypting content, obtain the image information of the user's body part according to the reception of the user input for encrypting content, calculate the feature information from the obtained image information, calculate the crypto key and the hint information related to the crypto key based on the feature information, encrypt the content based on the crypto key, and store the hint information in correspondence to the encrypted content.

16. The device of claim 15, wherein, when obtaining the image information of the user's body part according to the reception of the user input for encrypting the content, the one or more computer programs further include computer-executable instructions that, when executed by the one or more processors, cause the device to:

displaying identification information of a plurality of body parts capable of being used for encryption, according to the reception of the user input for encrypting the content, receiving a user input of selecting a body part from among the plurality of body parts, and controlling the sensor corresponding to the selected body part to obtain image information of the selected body part.

17. The device of claim 15, wherein the one or more computer programs further include computer-executable instructions that, when executed by the one or more processors, cause the device to:

identify whether a user is an owner of the device, based on the feature information, and display, according to identification that the user is not the owner of the device, a message indicating that the content cannot be encrypted.

18. One or more non-transitory computer-readable storage media storing one or more computer programs including computer-executable instructions that, when executed by one or more processors of a device, cause the device to perform operations, the operations comprising:

displaying, by the device, identification information of encrypted content;

receiving, by the device, a user input of selecting the encrypted content;

controlling, by the device, according to the reception of the user input of selecting the encrypted content, a sensor to obtain image information of a user's body part;

calculating, by the device, feature information of the user's body part from the obtained image information;

reproducing, by the device, a crypto key based on the calculated feature information of the user's body part and hint information stored in correspondence to the encrypted content;

decrypting, by the device, the encrypted content based on the reproduced crypto key; and displaying, by the device, the encrypted content according to the decryption of the encrypted content, wherein the hint information is included, as meta information of a file including the encrypted content, in the file.

19. The one or more non-transitory computer-readable storage media of claim 18, wherein the hint information is included, as meta information of a file including the encrypted content, in the file.

\* \* \* \* \*